US011117679B2

(12) United States Patent
King

(10) Patent No.: US 11,117,679 B2
(45) Date of Patent: Sep. 14, 2021

(54) METHOD OF TRANSITING AN AIRCRAFT ARRIVING IN AND DEPARTING OUT OF AN INTEGRATED MULTI-LEVEL AIRPORT TERMINAL

(71) Applicant: Raymond King, Miami, FL (US)

(72) Inventor: Raymond King, Miami, FL (US)

(*) Notice: Subject to any disclaimer, the term of this patent is extended or adjusted under 35 U.S.C. 154(b) by 47 days.

(21) Appl. No.: 16/711,963

(22) Filed: Dec. 12, 2019

(65) Prior Publication Data

US 2020/0156807 A1    May 21, 2020

Related U.S. Application Data

(63) Continuation-in-part of application No. 15/174,934, filed on Jun. 6, 2016, now Pat. No. 10,544,599.

(51) Int. Cl.
| | |
|---|---|
| *B64F 1/30* | (2006.01) |
| *G08G 5/00* | (2006.01) |
| *B64F 1/04* | (2006.01) |
| *B64F 1/22* | (2006.01) |
| *E04H 6/44* | (2006.01) |

(52) U.S. Cl.
CPC ............... *B64F 1/30* (2013.01); *B64F 1/04* (2013.01); *B64F 1/222* (2013.01); *E04H 6/44* (2013.01); *G08G 5/0043* (2013.01)

(58) Field of Classification Search
CPC .... B64F 1/30; B64F 1/31; B64F 1/002; B64F 1/005; B64F 1/22; B64F 1/222; B64F 1/221; E04H 6/00; E04H 6/08; E04H 6/10; E04H 6/44; E04L 31/342
See application file for complete search history.

(56) References Cited

U.S. PATENT DOCUMENTS

| | | | | |
|---|---|---|---|---|
| 1,751,721 A | * | 3/1930 | Bellmann | E04H 6/44 414/233 |
| 3,675,378 A | * | 7/1972 | Neumann | E04H 6/44 52/65 |
| 3,833,138 A | * | 9/1974 | Dean | B65D 19/44 414/430 |
| 6,279,855 B1 | * | 8/2001 | Domer | B64F 1/00 244/114 R |
| 6,315,243 B1 | * | 11/2001 | Peterson | B64F 1/00 244/114 R |
| 6,684,443 B2 | * | 2/2004 | Thomas | B64F 1/305 14/69.5 |

(Continued)

FOREIGN PATENT DOCUMENTS

GB          1445001 A * 8/1976 ............... B64F 1/00

*Primary Examiner* — Babajide A Demuren

(57) ABSTRACT

A method of transiting at least one aircraft arriving in and departing out of an integrated, multi-level airport terminal system is disclosed. The method includes determining at least one transiting requirement of at least one aircraft arriving to an airport runway, ascertaining the positions of all the other aircraft transiting through a cell of a row, guiding the aircraft from the airport runway on to a ramp member, facilitating the transiting requirement of the aircraft within the enclosed internal environment of the cell of the row in a sequential and linear arrangement, and directing the aircraft out of the enclosed internal environment of the cell of the row to an engine run up area for the at least one aircraft to depart the integrated, multi-level airport terminal.

13 Claims, 12 Drawing Sheets

(56) References Cited

U.S. PATENT DOCUMENTS

| | | | | |
|---|---|---|---|---|
| 7,465,141 B1* | 12/2008 | Fournier | ................... | E04H 6/28 |
| | | | | 414/234 |
| 2002/0104176 A1* | 8/2002 | Thomas | ................. | B64F 1/305 |
| | | | | 14/71.5 |
| 2002/0145079 A1* | 10/2002 | Burley | .................... | B64F 1/002 |
| | | | | 244/114 R |
| 2006/0038069 A1* | 2/2006 | Cawley | .................... | B64F 1/00 |
| | | | | 244/114 R |
| 2011/0010912 A1* | 1/2011 | Bausen | .................... | B64F 5/10 |
| | | | | 29/428 |
| 2013/0228651 A1* | 9/2013 | Laudrain | ................ | B64C 39/02 |
| | | | | 244/118.2 |
| 2014/0010619 A1* | 1/2014 | Dor-El | ...................... | E04H 6/44 |
| | | | | 414/240 |
| 2015/0008286 A1* | 1/2015 | Cox | ......................... | B64F 1/30 |
| | | | | 244/137.2 |
| 2015/0166174 A1* | 6/2015 | Cox | ..................... | B64F 1/3055 |
| | | | | 244/50 |
| 2015/0329219 A1* | 11/2015 | Soederhuizen | ........... | B64F 1/00 |
| | | | | 244/114 R |
| 2017/0008618 A1* | 1/2017 | Cox | ...................... | B64C 25/405 |
| 2017/0107000 A1* | 4/2017 | Endres | ..................... | B64F 1/04 |
| 2019/0339720 A1* | 11/2019 | Petersen | ............. | G08G 5/0013 |
| 2020/0010216 A1* | 1/2020 | Devaux | .................... | B64F 1/31 |

* cited by examiner

METHOD OF TRANSITING AN AIRCRAFT ARRIVING IN AND DEPARTING OUT OF AN INTEGRATED MULTI-LEVEL AIRPORT TERMINAL

BACKGROUND OF THE INVENTION

Technical Field

The embodiments herein generally relate to method of transiting an aircraft, more particularly, to a method of transiting aircraft through an integrated, multi-level airport terminal for improving airline passenger and cargo transit operations.

INFORMATION ABOUT PRIOR APPLICATIONS AND UNITED STATES GOVERNMENT RIGHTS

This application claims priority from the Non-Provisional application Ser. No. 15/174,934.

Description of the Related Art

The aviation industry is extremely dynamic and competitive. As the globalization of business and trade continues to grow, air travel will be increasingly paramount for the development of our global economy. Despite the progressive demand, innovative designs and operational protocols of today's airports have been unable to rise to the most difficult of the airline passenger challenges. No matter the airport one arrives or departs from, present-day airports are becoming overwhelmingly crowded due to wide range of factors. With the current pace of travel, many airports around the world are expected to exceed their maximum capacity within the next five years. Airports with capacity limitations are undoubtedly causing drastic inefficiencies that are detrimentally affecting our global economy.

The current infrastructure and operations of airports causes delayed flights, along with weather. Statistics at one Brazilian airport indicates that just 41 percent of all flights leave on time and only 59 percent of flight arrive on schedule. A delayed flight has the potential to cost millions of dollars to businesses—as the flight's arrival is delayed, there is an increase chance of issues with slot availability, not to mention the valuable time wasted during an extended travel schedule. A delayed flight impacts passengers by having them negotiate through various security checkpoints, relocating gate changes and the associated reissuing of boarding passes. There are bottlenecks of people everywhere, within the airport terminal, the tunnels between terminals, at every security checkpoint, and baggage claim areas. Not surprisingly, it turns out that airport operations are not always in sync with passengers, airport authorities and airline activities, especially as the flight departure delays in one country's airport system average 54.2 minutes across ten airlines in 2014. The fact that passengers are routinely forced to suffer in deadlocked security lines, unannounced gate changes, "last call" announcements, and ultimately, flights not leaving as scheduled or cancelled altogether, as in the case of one airport system where the average of two percent represented 44,094 cancelled flights in 2014, is unacceptable.

An airport terminal system is one of the key elements within the airport's overall environment. The relationship of the airport terminal to the airport is similar to one that commercial buildings have with a modern-day city. Specifically, airport terminals include complex operations between airlines, airport authorities, and passengers. Growing inefficiency caused by growing capacity (World passenger traffic increased by 6.1 percent in 2015 according to Airports Council International ACI) impacts operations and highlights antiquated methodologies causing more and more passengers to become regularly frustrated. Even the most formidable, sophisticated airport hubs like Heathrow Airport in London are experiencing severe congestion and flight delays. Passengers at Heathrow are required to traverse unreasonable distances between concourses, ticket controls, customs and immigration, public transportation and security lines. The growth of other megacities like New York, New Delhi and Beijing are also encountering similar airport challenges.

Furthermore, the aviation industry trend suggests that more and more airline companies are looking to increase the size of aircraft to include more amenities for passengers and provide non-stop flights for high traffic, high volume international destinations. Accordingly, Airbus®, the European aircraft company has been manufacturing the A380, a double-deck, wide-body, four-engine jet airliner at a steady rate. It is the world's largest passenger airliner. Airlines like Qantas® and Emirates® are making significant investments to make the A380 a flagship of their respective fleets. However, despite the continuing demand, major airport hubs around the world have provided minimal infrastructure to accommodate the large wide body aircraft.

The issue for larger aircraft apart from their size, is the restrictive airport taxing space and terminal ramp space. At most of the world's larger airports, provisioning space to accommodate the A380 has been inhibited by, the legacy designs themselves, and delayed investment decision making. Accordingly, in order to smooth the process of enplaning and deplaning the aircraft, Airbus® strategically provided multiple access doors for both lower and upper cabins. On reflection, enplaning/deplaning the 69 passengers on the upper deck of the Boeing B747-300 (1983) was via a staircase, as only emergency doors existed for the flight crew at that level. Moreover, even if the airport itself is built to take on the double deck aircraft, the process of ticketing, checking luggage and security screening of so many people can be a logistical nightmare for current airport terminal operations since the larger wide body aircraft are positioned at the end of a pier or satellite building, away from all central services.

Larger aircraft like the A380 are also primarily designed to serve international flights. As such, if weather or scheduling problems were to force two or more A380s to arrive somewhere at the same time, airports estimate that current standards in airport terminal operations could take hours for every passenger to be processed and connect with their luggage. Similar problems were also encountered, when the Boeing® B747 was first introduced in 1969. Comparatively, the A380's introduction fared better in 2007.

In order to alleviate the aforesaid issues, therefore, a number of methods of transiting have been developed to improve airports, and more importantly, solve outstanding problems related to airport terminal operations, infrastructure, and integration. One such airport transiting method is using a multilevel aircraft infrastructure having a separate aircraft landing and take-off runway strips with passenger and cargo movement facilities as a single, consolidated building. Specifically, the airport transiting method incorporates using a landing strip on the roof of the structure, an elevator to physically transport the aircraft to lower levels for passenger boarding, maintenance, and fuelling operations. However, this method is not sufficiently integrated to improve airport operations. Specifically, aircraft elevators are impractical for commercial aviation facilities. This method also increases problems related to airline and passenger safety, increases delays in flight times and increases costs by, requiring complete transformation of current airports, and additional machinery and devices. Accordingly, the method has many impractical features that do not solve issues related to integration of aviation operations born by the current legacy designs of airport terminals.

Another airport transiting method includes using a covered construction featuring elongated runways with walls, positioned next to each other with adjacent taxiways and loading docks. The runways are positioned over the airport terminal with other portions of the airport. However, the closely positioned runways in relation to portions of the airport terminal buildings vastly threatens aircraft and passenger safety. Specifically, having closely positioned runways on top of airport facilities will promote aircraft related accidents. The method also fails to relieve issues related to airport operations, integration of airport terminal facilities and passenger/aircraft congestion. Accordingly, the airport transiting method has many impractical features that do not solve issues related to integration of aviation operations.

Another airport transiting method includes using a radial shaped structure having subterranean levels. Although this airport terminal includes subterranean levels, it has means for elevating an aircraft in between the levels via a lift sled. Having a lift to elevate an aircraft within the aviation system is impractical. Moving an expensive aircraft containing numerous passengers involves unnecessary movements. This can easily prove to be a major safety hazard to aircraft and passengers alike. Specifically, the lift can easily malfunction or completely stop working, causing delays and passenger paranoia. Passengers could be stuck in the aircraft for hours. Furthermore, having to physically move a multi ton, multimillion-dollar aircraft via a lift can be highly arduous, expensive, and would require drastic changes to airports worldwide. Essentially, this airport transiting method has many impractical features that do not solve issues related to integration of airport operations.

Yet another airport transiting method is disclosed, which comprises using passenger areas and hangar areas in a multi-level building. While this method has multi-levels by having hangar areas adjoining the passenger areas, the method does not disclose moving of an aircraft effectively into the hangars. Specifically, the airport method does not disclose sequencing of plurality of aircraft directly within the airport terminal building itself. As such, aircraft would have to be stored in the hangar in no particular order or orientation. Having to store multiple commercial aircraft of large dimensions in the hangar facilities would also require acres of additional space. Furthermore, the aircraft have to be stored in separate hangar areas, wherein the passengers do not have direct access to the aircraft for enplaning and deplaning purposes. The hangar areas require a portal, which provides access for aircraft from an apron outside the airport building, not within it. Accordingly, the airport transiting method has many impractical features that do not solve issues related to integration of airport operations, beyond today's experience.

There is yet another transiting method which comprises using an "aeroplane" hangar with multiple stalls connecting to a central space. However, the hangar is a stand-alone single level structure, not a multi-level structure promoting integration of airport operations. The structure further requires the fuselage of the aircraft be moved into the central space for major repairs, and not within the same building. Accordingly, the transiting method has many impractical features that do not solve issues related to integration of airport operations.

The aviation industry is in a dire need of a method of transiting aircraft through an integrated, multi-level airport terminal to help eliminate current issues, improve operations, lower costs, increase profits, alleviate congestion, promote safety and security, and meet the future demands of aircraft frequency. If a method of transiting aircraft through an integrated multi-level airport terminal were developed, it would be structured in a manner which overcomes issues and/or disadvantages of the type set forth above or otherwise known to still exist in this field of art.

SUMMARY OF THE INVENTION

The present invention is intended to present a solution to the aforementioned operational needs as well as the growth driven capacity needs, which remain in the relevant field of art. As such, and for purposes of clarity in describing the structural and operative features in at least one preferred embodiment, the present invention is directed an method of transiting aircraft through an integrated, multi-level airport terminal. The method of transiting aircraft through an integrated, multi-level airport terminal system does not discriminate against any aircraft regardless of the aircraft's type, size, orientation, structure, or dimensions. While the method of transiting aircraft through an integrated, multi-level airport terminal may vary based on certain conditions, the present invention is well-suited for commercial airlines, including but not limited to the Boeing® B777 aircraft and the larger, 600-plus passenger, commercial aircraft such as the A380 built by Airbus®. Conversely, the method of transiting aircraft through an integrated, multi-level airport terminal can be implemented even within a much smaller-sized, executive airport environment. In such a smaller airport terminal environment, the method of transiting aircraft through an integrated, multi-level airport terminal has the structural and operative features to compliment smaller personal and business jets as well.

The method of transiting aircraft through an integrated, multi-level airport terminal of the present invention builds upon the legacy designs of current airports. Therefore, it would present little difficulty for today's airport architects, designers and builders to construct it in a reasonable amount of time and at a relatively inexpensive cost. The method of transiting aircraft through an integrated, multi-level airport terminal is relatively seamless for aircraft transit. It does not require addition of external supporting devices or apparatus to manipulate the positioning of the transiting aircraft. The method of the present invention may prevents the hassle of manipulating the position or orientation of the arriving or departing aircraft. This saves a lot of transiting time for the aircraft. The method of the present invention allows flights to stay on schedule with timely arrivals and departures. The method of transiting aircraft through an integrated, multi-level airport terminal also does not require the help of escalators, elevators, or other expensive, external means to support the orientation or positioning of the transiting aircraft.

As will be described in greater detail subsequently herein, in one of the several preferred embodiments, the method of the present invention includes a plurality of cells. At least some of the plurality of cells are disposed in an adjoining relation to one another. The adjoining relation of cells with each other helps to yield in successful transit of arriving and departing aircraft through each of the cells' internal environments. The adjoining relation of the cells defines at least one row. As such, each row can include a set of two adjoining cells, or alternatively, in one of the many preferred embodiments, a set of four adjoining cells. The precise determination in the number of adjoining cells within at least one row is based on many factors. These factors include, but are not limited to transiting traffic of the airport, the size of the airport, the requirements of arriving and departing flights, the number of originating, the number of transfer flights, and the amount of passengers. In fact, there is no limitation whatsoever as to the number of cells the method of transiting aircraft through a multi-level airport terminal can have.

As an example, the method of the present invention may have four cells, wherein each cell is disposed in an adjoining relation to one another. The adjoining relation of each cell to each other defines at least one row. The one row of four adjoining cells are in a corresponding relation to another row of four adjoining cells. The set of four adjoining cells within one row are also in a corresponding relation to a set of four adjoining cells within another row. This structure is highly flexible and can be extended to any number of cells and rows.

Each cell of the four cells defining the one row also includes many structural and operational features. These features provide transiting services to an aircraft while it transits within the internal environment of each cell. The transiting services within each cell can include, and is not limited to: passenger-handling, passenger-transfer, aircraft cabin, ramp, catering, baggage handling, lavatory, cleaning, aircraft re-fuelling, aircraft maintenance, aircraft repair, engineering, cargo-handling, aircraft towing, aircraft marshalling, and aircraft load control amongst others.

Furthermore, the method of the present invention includes at least one aircraft to transit through the internal environment of the cells within the row. The internal environment of each cell is enclosed. It is structured to accommodate an entire aircraft within its internal environment. All cells of the present invention can accommodate the entire aircraft without any structural limitations. The adjoining position of each cell in relation to the other within the row allows the aircraft to transit and move from the internal environment of one adjoining cell into the internal environment of the next adjoining cell. Alternatively, the adjoining relation of each cell in relation to one another may also allow a plurality of aircraft to transit simultaneously. The adjoining relations of each of the cells can have the aircraft successfully transit through each of their internal environments within the same row. The method of the present invention is also structured to transit an aircraft through the internal environment of the cell, wherein all the transiting requirements of the aircraft can be sufficiently completed within it. As such, the method of the present invention allows for the transiting requirements of the aircraft to be fully satisfied within one cell, or alternatively, within a plurality of cells. Thus, the method of the present invention is able to transit single or multiple aircraft undergoing a wide range of transiting requirements simultaneously.

In other preferred embodiments, the method of transiting aircraft through an integrated, multi-level airport terminal may include using each cell comprising specific operational processes only. As such, one of the adjoining cells may include using structural and operative features supporting deplaning and enplaning of passengers. The second next adjoining cell to that one cell within the same row can include using structural and operational features related to cargo handling. The third next adjoining cell to that second cell within the same row can include using structural and operative features related to fuel, maintenance, cabin, or catering. Each adjoining cells within each row may include using specific structural and operational features that provide only certain aircraft transiting services within each of their internal environments.

In yet another one of the many preferred embodiments, each adjoining cell within each row can comprehensively include using all the structural and operational features sufficient to transit at least one aircraft. Services such as cargo, deplaning of passengers, enplaning of passengers, catering, fuel, maintenance, etc. can all be implemented within the internal environment of one cell. The aircraft would be able to complete all of its transiting requirements. The aircraft, in this embodiment, would not require any transiting procedures within the internal environments of any other cells within this row. The adjoining relation of each cell in relation to one another along with the corresponding relation of one row in relation to another row significantly contributes towards the integrated, structural and operative characteristics of the method of transiting aircraft through an integrated, multi-level airport terminal.

Furthermore, in other preferred embodiments, each of the plurality of cells of the method of transiting aircraft using an integrated, multi-level airport terminal further includes a plurality of levels. The plurality of levels may include several levels. The levels may include, and are not limited to underground level, ground level, first level, second level, third level, fourth level, fifth level, etc. Each level of the plurality of cells can be customizable based on the operational needs of the airport. Each level within each of the plurality of cells can be designated for a specific or multiple operational areas. Examples of operational areas on each of the levels may include, upper boarding area, lower boarding area, ticketing area, duty free shops area, customs and immigration clearance area, kid's area, chapels, airline operations, administration, arrival gates, arrivals area, storage area, baggage claim area, mechanical services area, public transportation area, etc. As it can be seen, each of the areas on each level can be used for one or more operational processes directed towards the methods of transiting aircraft though the integrated, multi-level airport terminal.

Furthermore, while there is no limitation on the number of levels the present invention may have, in one of the many preferred embodiments, the plurality of levels may include a ground level incremented by five additional levels and at least one underground levels below the ground level. The number of levels can vary and depend on several factors. These factors may be based on operational demands of the airport, airport space, passenger traffic, number of transiting flights, number of originating flights, costs, aviation safety codes, laws of different countries, etc.

For instance, the ground level of the airport terminal can accommodate and transit an entire aircraft. The other levels of the airport terminal can be utilized for other operational process contributing towards the methods of transiting aircraft. The first level or one of the lower levels of the cell on the "port side" of the aircraft can be used as departure area primarily for enplaning passengers on one side of the lower level of the aircraft. Conversely, the first level of the cell on the other side of the cell, can also be utilized as a designated arrivals area on the "starboard side" of the aircraft primarily for deplaning passengers from the lower level of the aircraft. Similarly, each of the other levels of the method of transiting aircraft through an integrated, multi-level airport terminal can be disposed on each side of the transiting aircraft within the internal environment of at least one cell. Having levels disposed on either side of the transiting aircraft with the internal environment of at least one cell allows for more efficiency in many of the aircraft transit related operational processes. For example, by enplaning and deplaning passengers on either (port or starboard) side of the aircraft on each side of the first level or other lower levels can promote efficiency in operational processes, including improvement in transiting times of aircraft, lower transiting costs, and decrease in ramp time for the aircraft at the airport terminal. The plurality of levels can be located below the ground level of the airport terminal. In this preferred embodiment, the plurality of levels of the present invention may include at least one underground level, located below the ground level within each of the plurality of cells.

In one of the other preferred embodiments, the method of transiting at least one aircraft in and out of an integrated, multi-level airport terminal includes determining the transiting requirement of at least one aircraft arriving on an airport runway. Particularly, the airport traffic control and tower authorities will determine the transiting requirement of the aircraft arriving at the multi-level airport terminal prior to its arrival ahead of time. This is done using a computer programmable scheduling medium. The scheduling medium may utilize certain algorithms in deciphering the transiting requirement of the aircraft arriving at the airport terminal. Once there is sufficient knowledge acquired from the scheduling medium, the traffic control and tower authorities will communicate the information on the transiting requirement of the aircraft to the appropriate personnel of the control tower. The transiting requirement may include, but not limited to planned schedule, any further departure requirements, the length of time at the gate, and any special needs involving technical or passenger issues that may need to be resolved. The assessment of the transiting aircraft will be computed, so as to avoid congestion at any one of the plurality of rows available for transiting the aircraft. The process is carried out by the authorities using many means available to then, including computer programming power to help resolve sequencing issues using network analysis, queueing theory, or high-level simulation to guide their decision-making processes. All stakeholders will be doing all possible to hold steady to the published airline schedules. The authorities may also directly communicate information regarding the cell allocation with the flight crew of the aircraft, prior to its arrival. The transiting requirement of each of the arriving aircraft is typically synchronized with the ground control, and ultimately to each of the cell's self-docking system. The tower control, ground control, airlines, and all handlers will be in communication with each other so that no time is lost in pulling the aircraft into the cells. These actions initiate the transiting requirement of the aircraft within each of the cells. Additionally, there are several other factors that contribute towards cell allocation, including, but not limited to whether the aircraft has a final destination at the airport terminal system, if the aircraft is a transfer flight, if the aircraft requires a quick turnaround with only embarking and disembarking of transfer passengers, if the aircraft is a commercial aircraft or a small business jet, or alternatively, if there are other exigent circumstances that has mandated landing of the aircraft at the airport terminal system.

The method of transiting at least one aircraft in and out of an integrated, multi-level airport terminal further includes ascertaining the positions of other aircraft transiting through each one of a plurality of cells. Ascertaining the positions of other aircraft transiting through each one of the plurality of cells further includes determining the transiting positions of each aircraft within the internal environment of each one of the plurality of cells for the aircraft to transit therein, authorizing at least one cell of the plurality of cells for the aircraft to transit, determined by the cell availability and the transiting requirement of the aircraft and communicating the availability of at least one cell of the plurality of cells with ground personnel to facilitate aircraft transit therein. More specifically, once the ground control and flight operations authorities determine the transiting requirement of the arriving aircraft, the position of each of the other transiting aircraft within the airport terminal system is also ascertained. The process is initiated using computer programming. It also depends upon a high degree of computer programming to make the right determination.

Furthermore, an airport surface detection equipment (ASDE) locates precisely the positions of each transiting aircraft within the internal environment of each of the cells using a graphical display. ASDE functions based on a computer generated program. It may also include algorithms that can precisely locate the positions of each transiting aircraft with the internal environment of each of the cells. The ground control and flight operations authorities are equipped with a search radar, which graphically displays each transiting aircraft within each cell of the integrated, multi-level airport terminal system. The authorities also utilize a tower automated ground surveillance system (TAGS), which displays the position of each aircraft from a signal transmitted by each aircraft. The signal reveals details of each aircraft including each unique flight identifier in real time within each of the cells of each row of the airport terminal system.

The method of transiting at least one aircraft in and out of the integrated, multi-level airport terminal also includes guiding or pulling the at least one aircraft on a ramp member through an internal environment of at least one cell of the plurality of cells. Once a determination is made as to which row of the present invention is available for the aircraft based on the aircraft's transiting needs, information will be communicated to the aircraft pilot who will touch down, taxi, and bring the aircraft to a stop at the row assigned to it. The tower control, ground control, airlines, and all handlers will be in communication with each other, so no time is lost in pulling the aircraft into any rows or cells. Each cell within each defined row of the airport terminal system can be marked or numbered in a distinct manner, allowing the ground control and operations authorities and aircraft personnel to effectively communicate the position of the row and the cell within the airport terminal system. After the communication is effectively made, the aircraft is guided into the row and the cell. The row and the cell assigned to any transiting aircraft will be operating as a short, medium or long duration turnaround time, so based on this criteria the time in each cell and each row is established to complete each service function before the aircraft is moved down each cell and each row. While most aircraft are capable of facilitating ground movement on the taxiway under their own power, once the position of the cell for the transiting aircraft is determined and communicated with the aircraft personnel, the aircraft can be towed on the ramp member with the aid of an external power. The external power may include, but is not limited to tractors, tugs, or other similar vehicles capable of using their power to successfully place the aircraft into motion and move it into its desired location on the ramp member.

Moreover, while guiding the aircraft through the internal environment of at least one cell, a sequential and linear arrangement of transiting aircraft in and out of the integrated, multi-level airport terminal is preferably maintained. As such, the method of guiding at least one aircraft through the integrated, multi-level airport terminal system includes utilizing a sequential and linear arrangement to facilitate transit of at least one aircraft into the internal environment of at least one cell of the plurality of cells. The sequential and linear arrangement of the aircraft provides priority and organization of aircraft transiting into the integrated, multi-level airport terminal system. The sequential and linear arrangement allows the aircraft to strategically position themselves within each respective cell of each respective row based on several determining factors as previously mentioned. The transiting aircraft are sequentially and linearly positioned within each cell of each row of the airport terminal system to avoid congestion and smooth flow of traffic. The sequential and linear arrangement of aircraft within the integrated, multi-level airport terminal system allows transiting aircraft to move effectively through the rows from arrival, transit, and departure. As an example, the transiting aircraft with the quickest transiting turnaround typically may be sequenced in front of the aircraft with a relatively slower transiting turnaround and so on. In other preferred embodiments, the movement of each aircraft can be executed in unison, using a plurality of sensors in each cell throughout the row, so that any equipment, boarding bridges, tools, and ground handles are cleared from the path of the aircraft, before other aircraft are moved in a given row to the next cell for other servicing needs. The whole activity within the row can be controlled by a central processing device, which operates, when all the cell sensors agree that it is safe for an aircraft to move. Once all the sensors are "go" or agree that it is safe for one aircraft to move within the row, another aircraft requiring transiting services will be moved into that cell, while simultaneously allowing the aircraft occupying that cell to move to the next cell, in efforts to get that aircraft ready for the runway to depart and so on.

Once an aircraft leaves the last cell before exiting the row, another aircraft is being pulled into the first cell of that row on the ramp member. The aircraft pilot brings the aircraft to a complete stop. The pilot effectively will shut down all the aircraft engines soon thereafter. The aircraft engines will only be started up again once the aircraft has been towed to an engine run up area after completely existing the row through all the cells and the airport terminal. This sequencing of aircraft through each row and cell in a linear orientation provides much flexibility to handle short, medium, or long turnaround aircraft independently. This means some rows are transiting aircraft faster than others, but all based upon various factors, including, but not limited to flight schedules and planned turnaround times. No aircraft can plan to occupy any cell longer than the allocated time it is given, so delays of any kind will require towing of the aircraft to a stand at the edge of an apron.

In another instance, a transiting aircraft, which is an originating aircraft (aircraft originating from the location where the airport terminal system is physically located) may be sequenced in a different cell of a different row of the airport terminal from a transfer aircraft (arriving from another airport of another city to the airport terminal system) having to merely refuel, and enplane and deplane transfer passengers on to their ultimate destination. Likewise, the sequential and linear arrangement of the transiting aircraft with a quicker departure time may be given departure priority out of the internal environment of the row and the cell than the transiting aircraft with a slower departure time transiting in another row and cell with the slower departure time. Typically, however, aircraft with similar turnaround times will follow each other through the row of cells for a plurality of transiting services including, deplaning, baggage off, cleaning services, fueling, baggage and cargo on, and boarding passengers before departing according to the flight schedule. This efficiency in sequential and linear arrangement promotes an ideal flow of transiting aircraft in and out of the integrated, multi-level airport terminal system. It also prohibits the possibility of unwarranted congestion even within the busiest of airport terminals around the world.

The method of transiting at least one aircraft in and out of the integrated, multi-level airport terminal further includes facilitating the transiting requirement of at least one aircraft within the internal environment of at least one cell. More specifically, the transiting requirement can include, but are not limited to a plurality of operational process such as passenger enplaning and deplaning, cargo handling, cargo security, aircraft maintenance, aircraft fuelling, baggage transfers, baggage handling, lavatory, cleaning, cabin, catering, airport terminal services, field operations, etc. Accordingly, when at least one aircraft is guided to the cell and transits into the internal environment of the cell, the transiting requirements commence within the cell's internal environment. Of course, the nature of the transiting requirements, including the operational processes therein are determined by status of the aircraft (destination, transfer or 9 originating), ramp member times, size of the aircraft, type of aircraft, etc.

While the aircraft is transiting within the internal environment of at least one cell, the aircraft may also enplane and deplane passengers. For instance, while an originating aircraft, may have no passengers to deplane from the aircraft, a transfer aircraft may have several passengers, who need to enplane and deplane the transiting aircraft. Accordingly, the method of transiting at least one aircraft in and out of the integrated, multi-level airport terminal system includes utilizing a plurality of movable connectors disposed on an upper level and a lower level on each side of at least one cell for facilitating movement of passengers into and out of the at least one aircraft. Specifically, the movable connectors disposed on the lower and upper level of at least one cell allow passengers on the lower and upper level of the transiting aircraft to enplane and deplane without requiring the passengers on the upper level of the transiting aircraft to descend down to the lower level of the transiting aircraft, or alternatively, the passengers on the lower level of the transiting aircraft to ascend up to the upper level of the transiting aircraft. Having movable connectors disposed on the lower and upper level of at least one cell allows passengers to enplane the aircraft from the upper level and lower level of the cell. The movement of passengers on the upper and lower level also decreases the overall enplaning and deplaning times of the transiting aircraft. Furthermore, the plurality of movable connectors are located on the starboard side or on the port side of the transiting aircraft. Accordingly, in one of many preferred embodiments, passengers can board the transiting aircraft from upper and lower level of the cell onto the upper and lower level of the aircraft from the port side of the aircraft.

Conversely, the passengers can deplane from the upper and lower level of the transiting aircraft on to the upper and lower level of the cell from the starboard side of the aircraft. As such, having efficiency in enplaning and deplaning times minimizes the risk of flight delays and accommodates for extra time that the aircraft may need in other operational processes while transiting within the internal environment of the cell.

In one of the other many preferred embodiments of the present invention, the plurality of movable connectors temporarily connect on the starboard side or the port side of at least one aircraft for facilitating movement of passengers between the internal environment of the at least one aircraft and each of the levels on each side of at least one cell. Specifically, once the passengers have deplaned, only the service personnel have access to the plurality of movable connectors on the starboard side. Once the service tasks are completed, the plurality of movable connectors on the starboard side are withdrawn as part of immigration and security measures.

Furthermore, each of the movable connectors allow passengers arriving into or departing from various aircraft seating zones within the interior of the transiting aircraft to move freely between the arrivals area or departures area located on the lower and upper levels of at least one cell and the interior of the transiting aircraft. The plurality of aircraft seating zones can be determined by the designated seating positions of the passengers. Accordingly, when the movable connectors are temporarily connected with the exit or entrance doors on each of the lower and upper levels of the transiting aircraft and communicate with the interior of the aircraft, the arriving or departing passengers can move freely through the movable connectors between the interior of the aircraft, and the departures or arrivals area located on each level of the cell, primarily based on the aircraft seating zones determined by each passenger's designated seat.

Once the transiting requirements on at least one aircraft within the internal environment of the cell are fully completed, the aircraft is authorized for departure by the ground control authorities. When the aircraft is ready for departure out of the integrated, multi-level airport terminal system, the method of transiting at least one aircraft in and out of the integrated, multi-level airport terminal system includes directing the at least one aircraft on the ramp member out of the internal environment of at least one cell of at least one row of the plurality of cells for the aircraft departure. Particularly, the ground control and operations authorities determine the positions of other aircraft presently transiting through each of the plurality of cells. As such, the method of directing at least one aircraft on the ramp member out of the internal environment of at least one cell of the plurality of cells for the aircraft departure further includes determining positions of other aircraft transiting through each of the plurality of cells. Since multiple aircraft may be ready for departure simultaneously or within close proximity of times, it is necessary for the authorities to coordinate all movements of the aircraft within each cell of each row. Furthermore, safety is always a concern, so the authorities will ensure that there is a safe sequencing of aircraft at the integrated, multi-level airport terminal system. As such, the authorities determine the positions of other transiting aircraft within each of the cells within the rows. Each cell is equipped with proximity sensors activated by the central processing device. The central processing device is computer programmable. The central processing device may use algorithms to ensure that the sensors work autonomously and for the purpose desired by the present invention. The central processing device is configured to ensure that the sensors work effectively towards a safe clearance and departure of the aircraft. The aircraft can then proceed with the aid of external power such as tugs or tractors towards the airside of the integrated, multi-level airport terminal in a sequential and linear arrangement.

After the positions are verified and at least one aircraft is authorized for departure based on its scheduled departure time, the method of transiting at least one aircraft in and out of the integrated, multi-level airport terminal further includes utilizing sequential arrangement to facilitate transit of at least one aircraft out of the internal environment of at least one cell. Specifically, in one of the many preferred embodiments, the aircraft with quicker transiting times will transit in a cell adjacent to the aircraft with slower transiting times. Accordingly, in one of the many preferred embodiments, the aircraft with similar transiting times may strategically transit in at least one cell of the row, with other like aircraft transiting within the same row. The aircraft transiting times are accommodated by the sequencing processes of each cell and each row. Therefore, the aircraft can safely move out of the internal environment of the at least one cell of at least one row, where it had been transiting towards the outside environment on the airside of the airport terminal system, where a plurality of runways for take-off may be located.

In some embodiments of the present invention, the method of transiting an aircraft through the multi-level airport terminal depends upon the ability to bring the aircraft to the passenger within the terminal, which is the key to how transiting is achievable. At the first step, the aircraft is taxied by the pilot to a fix stop on the ramp area, which allows an autonomous coupling device to connect to the aircraft ready to be pulled through from the ramp member to the first cell, where the aircraft is stopped. At the second step, the process of servicing the aircraft commences within a time frame, which is a function of the aircraft's turnaround time and design parameters. Once the servicing is completed in the first cell and the area is assessed to be clear, the sensors will unlock the coupling device to move the first aircraft in the row to the second cell. Because of its multi-aircraft pull through capability, another aircraft in line with the row will be simultaneously pulled through to the first cell.

In some other preferred embodiments of the method of the present invention, the process may repeat until all cells are engaged servicing an aircraft, which share the same turnaround time requirement. After the first aircraft in the row has completed its servicing it will be de-coupled from the coupling device and towed to an engine run up area away from the terminal. The method runs like a conveyor, so maximum number of aircraft can be serviced in the shortest possible time using the method of the present invention. The method utilizes the fact that each aircraft has an identifier which will tell the handlers, which row it should be lined up to enter, based upon the known flight schedule and turnaround time planned. Once aircraft data is entered into a computer programmable scheduling medium, the pilot is advised which row and cell to dock the aircraft at by the ground personnel. Reviewing of various preferred embodiments of the method of the present invention makes it clearer that each row can generally be dedicated to the aircraft with the same turnaround times.

In some other preferred embodiments of the method of the present invention, as a passenger arriving on a low cost carrier flight into a short cycle row, is making a connection with an international wide body aircraft that is being serviced in the adjacent row, it may be the shortest transfer for a passenger at any airport in the global network. Throughout a typical day the aircraft sizes may change, as first the wide body international flights arrive in the early morning, and probably depart late at night to make the return flight overseas. Upon their arrival they will enter the designated row for the longest turnaround time and be processed. Since the next flight may be some hours away, the serviced aircraft may be towed to a stand at the edge of the apron, and when needed may be moved to the first available row, to receive its baggage, cargo, passengers, and meals on fast track basis. For the medium and small aircraft used throughout the day doing multiple flights, they may use the faster turnaround rows reflecting the busy time at the airport. In this scenario most of the rows may be dedicated to the fast turnaround flights, being handled in waves throughout the day.

Fast track basis means that the scheduling team, aware of the readiness of an aircraft, will look for a suitable row that can accommodate the aircraft by bypassing the early cells and going straight to Cells 3 or 4 where loading only is accomplished. In the worst-case scenario, the loading could be carried out at a stand using ramp vehicles and stairs to enplane passengers. Every effort may be made to use cells.

In some preferred embodiments of the present invention, transiting through a fast row consists of coupling to an aircraft, using a coupling device selected for the particular aircraft nose wheel assembly towing point, and pulling it into the first cell where servicing may take from ten to fifteen minutes, then pulled through to the second cell taking about 3 minutes and stopped. After another ten to fifteen minutes the aircraft is pulled to the third cell taking another three minutes. After ten to fifteen minutes the coupling device again moves the aircraft into the final cell taking about three minutes, where all servicing is completed over ten to fifteen minutes. The aircraft is now ready to exit the row and is towed to the engine run up area for its scheduled departure. The coupling device is computer programmable and is autonomous. A computer medium may be required to operate the coupling device. As such, it does not require any manual intervention to ensure its optimal operability with the context of the airport terminal.

In some preferred embodiments of the present invention, once all the computer-generated sensors are indicating the aircraft can be moved, the coupling device is de-coupled, so that the aircraft can be towed to the engine run up area. The coupling device rotates continuously back to the start of the process to autonomously connect with the next aircraft waiting to be serviced. The coupling device is disposed along a track for each cell, so that each coupling device pairs with one aircraft.

In some embodiments of the present invention, departure works in reverse to the initial coupling set up. A ramp towing vehicle may attach to the aircraft and pull the aircraft away from the terminal to an engine run up area, since no engines can be started within the enclosed internal environment of the airport terminal, or immediately outside it due to aviation regulations. Any other forms of towing may be employed to remove aircraft from the enclosed internal environment of the airport terminal.

Transiting a medium size aircraft turnaround time may simply change the length of stay in each of the cells to accomplish the respective tasks for the cells. The same holds true for the large wide body aircraft that may take at least two to three time the cell time of the fast cell aircraft. With several rows available it is understandable that a combination of turnaround times can be accommodated thus giving the airport terminal building a high degree of flexibility, in line with the business model employed by the airport operator.

For simplicity, convenience, and timing considerations the total terminal visit time may be equally divided by the number of cells stipulated by the airport designers, which determines how much service time is available for each cell activity. Should a row be dedicated to a major airline occupying multiple cells, then cell time could be reset to accommodate a particular requirement without impacting another airline. The reset cell time may be required for a longer fueling time than the original cell time, while it would reduce the time available for another cell activity.

In some embodiments of the present invention, the transiting aircraft in and out of the multi-level airport terminal is characterized by the same two operations that were conducted one inside and one outside of the gate structure of a traditional terminal, with connections bringing passenger and aircraft together at the gate area. The method now joins these two sets of operations under one roof, thereby bringing passengers and aircraft together in a more connected way, in a weather free environment. The method adds a functionality of pulling the aircraft through a series of cells where a series of servicing functions occur. First the airport terminal has a connects to the aircraft at the old ramp position and pulls the aircraft through the first row into the first cell, which starts the second set of operations to occur, and where passengers deplane, and baggage and cargo are removed. Passenger boarding bridges take the passengers off the starboard side of the aircraft, while subterranean robots remove the igloos filled with baggage and cargo. Once this function is completed and sensors release the aircraft, the aircraft moves to the second cell where waste services remove toilet waste, recyclable materials, and replenish potable water and other cabin supplies. Cabin cleaning crews access the aircraft through the starboard doorways and remove any trash still in the cabin areas. Following a sensor-controlled clearance the aircraft is pulled into the third cell where fueling takes place, and baggage and cargo are loaded on board. After the necessary clearance the aircraft is pulled into the final cell where passengers enplane through the port doorways to seating zones nearest to the boarding bridge used to enter the aircraft. Once all passengers are situated, the flight crew have completed their checks, and ground control have given the clearance to move, the coupling device decouples from the aircraft to allow for a tow tractor to pull the aircraft out of the terminal building to the engine run up area on the apron.

A ramp towing vehicle couples to the aircraft in the same way the coupling device operates and pulls the fully loaded aircraft out of the terminal onto an apron and to the designated engine run up area. Other towing systems could be utilized to complete this function.

Other rows in the terminal may be servicing aircraft selected for either the same routine, or may be a longer turnaround time, depending on the scheduling requirements of the airline. In any given hour one can see multiple aircraft all moving linearly, in a uni-directional manner through the internal environment of thee cell of the airport terminal at differing speeds of operations, eventually to move out of the terminal to prepare to fly off. Should several aircraft coincidentally arrive at the terminal exiting point at the same time, ground handlers may be instructed to prioritize or move each aircraft, to avoid a congested engine run up area.

In some embodiments of the present invention, the method results in the close connectivity of the aircraft and passengers coming together inside of the terminal by a series of passenger boarding bridges or movable connectors disposed inside of the airport terminal. One of the many requirements may be to reduce turnaround time of the aircraft being transited, which many times shows the deplaning and emplaning of passengers to be one of the longest functions to occur during turnaround of an aircraft. To overcome the growing congestion caused by the impact to the ever-tighter schedules being demanded of the aviation system, each of the longest functions in each cell may be addressed by utilizing more than one door to deplane and enplane passenger. For the smallest aircraft servicing one hundred passengers, two movable connectors may be enough, but for example, to a six hundred passenger count, multiple doors on the starboard side of the aircraft can be opened upon arrival to deplane the aircraft rapidly, thus freeing up the cabin for an early cleaning of the cabin. With double decked aircraft with two cabins of passengers, the movable connectors may be positioned to serve both levels at the same time, so avoiding congestion in the passenger hold areas. The movable connectors may be disposed with the internal environment of the cell of the airport terminal or can be autonomously positioned at selected door positions on the starboard side of the aircraft where passengers would deplane in the cell. Once the deplaning procedure is complete, the movable connectors acting as bridges for passengers to move to and from the aircraft would be stowed to allow for the movement of the aircraft as it departs the cell.

In one of many preferred embodiments, the movable connectors may again be deployed in another cell, so that cleaning crew could carry out their function. When the services are complete, the movable connectors would be stowed. In yet another cell of the present invention, the movable connectors can be connected autonomously to several doors on the port side of the aircraft to receive embarking passengers. Once the process deplaning process is completed, the movable connectors can return to their stowed position within the internal environment of the cell. The dimensions of the movable connectors may be determined by the sill height of the aircraft floors at one end and the airport terminal ground at the fixed end, giving a smooth passage way for passengers and crew to walk on or off the aircraft at the level of their seating location. The movable connectors may also be disposed in a communicating relation with a sensor control system, allowing the movable connectors to transform from a stowed position into an operational position. The number of movable connectors within the internal environment of each cell may be determined by the economics of the systems employed.

In some other embodiments, the method employs movable connectors are a sectional structure made in connecting parts, able to extend from the passenger terminal out to the connecting doors of the smallest to the largest aircraft parked at each cell. As an aircraft is pulled into each cell and stopped, the movable connectors are deployed to a selective door arrangement determined by the airport authority and airline concerned, for a given aircraft type. Most likely the deployment of movable connectors for boarding would be at least as many as for deplaning, although, the boarding process takes much longer than deplaning. The passenger may care only that once boarding starts, the passenger boarding bridge is in the right location for boarding, which is from the departure lounge out to the aircraft at the height of the seating zone location. The boarding bridge to door position may be placed close to the seating zone itself. The versatility of the movable connectors may be utilized to deplane on the starboard side and enplane on the port side at any sill heights of any aircraft, and in zones through the length of the aircraft. The passengers may deplane the aircraft in smaller groups and enter the arrivals lounge and make a connection to another aircraft.

Where an aircraft has two cabins, the moving connectors may be placed to give the best outcome. The method of transiting at least one aircraft arriving in and departing out of the integrated, multi-level airport terminal may include a plurality of movable connectors that are controlled by the central processing device to control a switch between at least one of (i) a first stowed position, and (ii) a second operating position Alternatively, in other preferred embodiments, the transiting aircraft may be located within the internal environment of the first cell within the row of four cells. As such, the transiting aircraft can be directed through the internal environments of each of the remaining three cells within the row, moving on the ramp member disposed in each of the cells, until the transiting aircraft reaches towards the outside environment on the airside of the airport terminal system, where a plurality of departure runways or taxiways may be located. These and other objects, features and advantages of the present invention will become clearer when the drawings as well as the detailed description are taken into consideration.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to predetermined boards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

BRIEF DESCRIPTION OF THE DRAWINGS

For a fuller understanding of the nature of the present invention, reference should be made to the following detailed description taken in connection 1 with the accompanying drawings in which.

DETAILED DESCRIPTION OF THE PREFERRED EMBODIMENT

Figure 1:
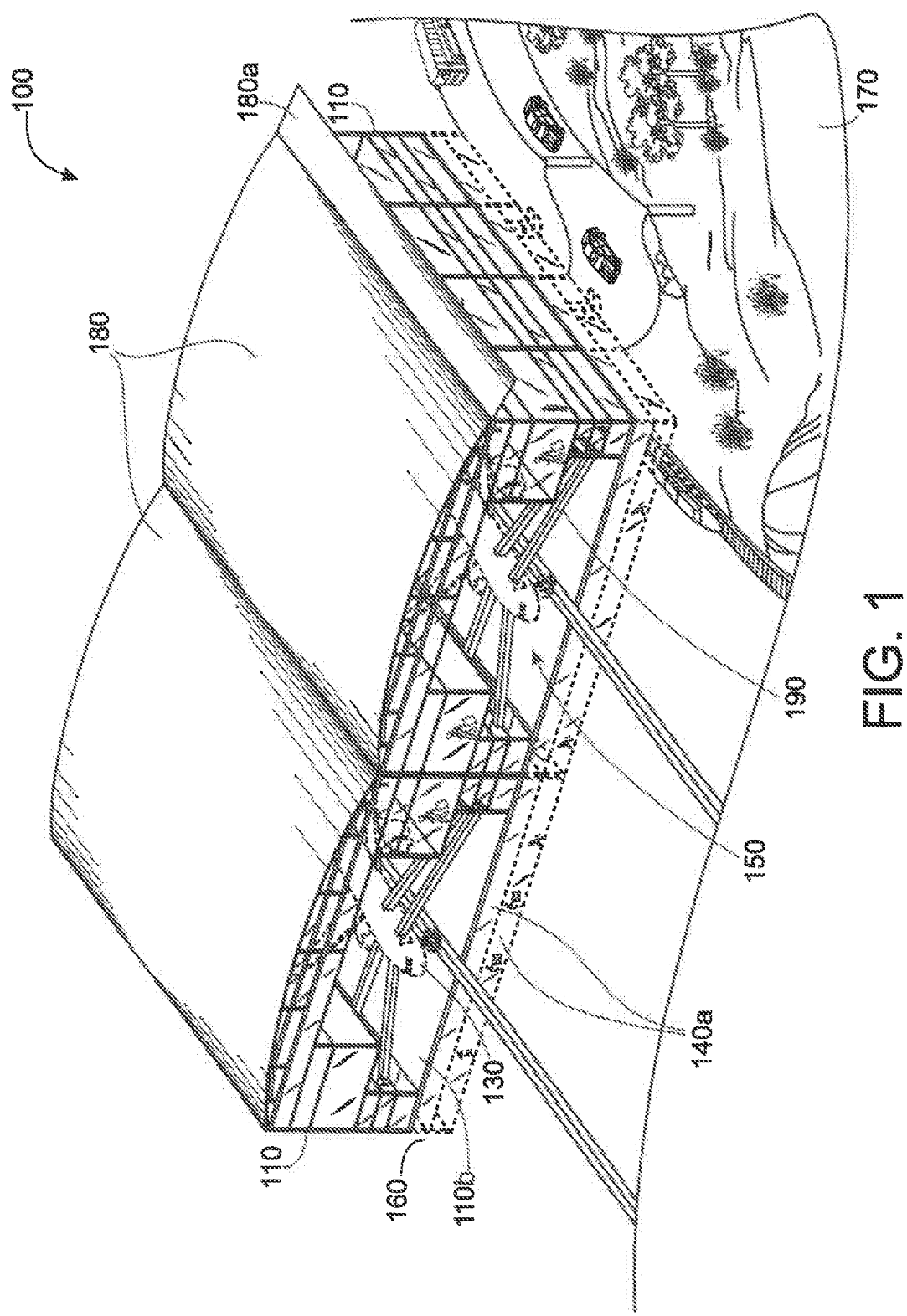
FIG. 1 is a perspective view of the integrated, multi-level airport terminal system in accordance to one of several preferred embodiments.
Figure 2:
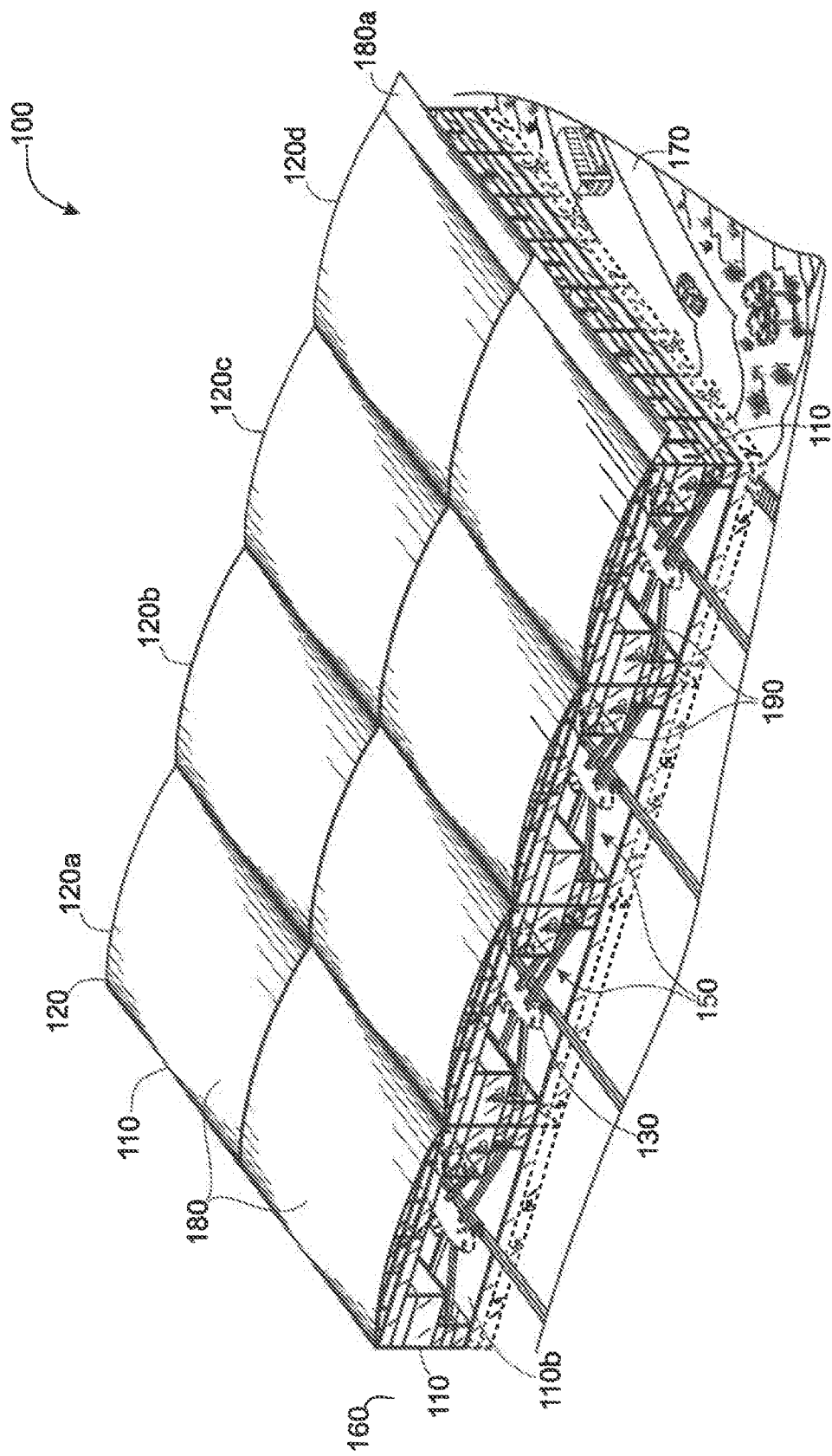
FIG. 2 is a perspective view of the integrated, multi-level airport terminal system in accordance to one of several preferred embodiments.
Figure 7:
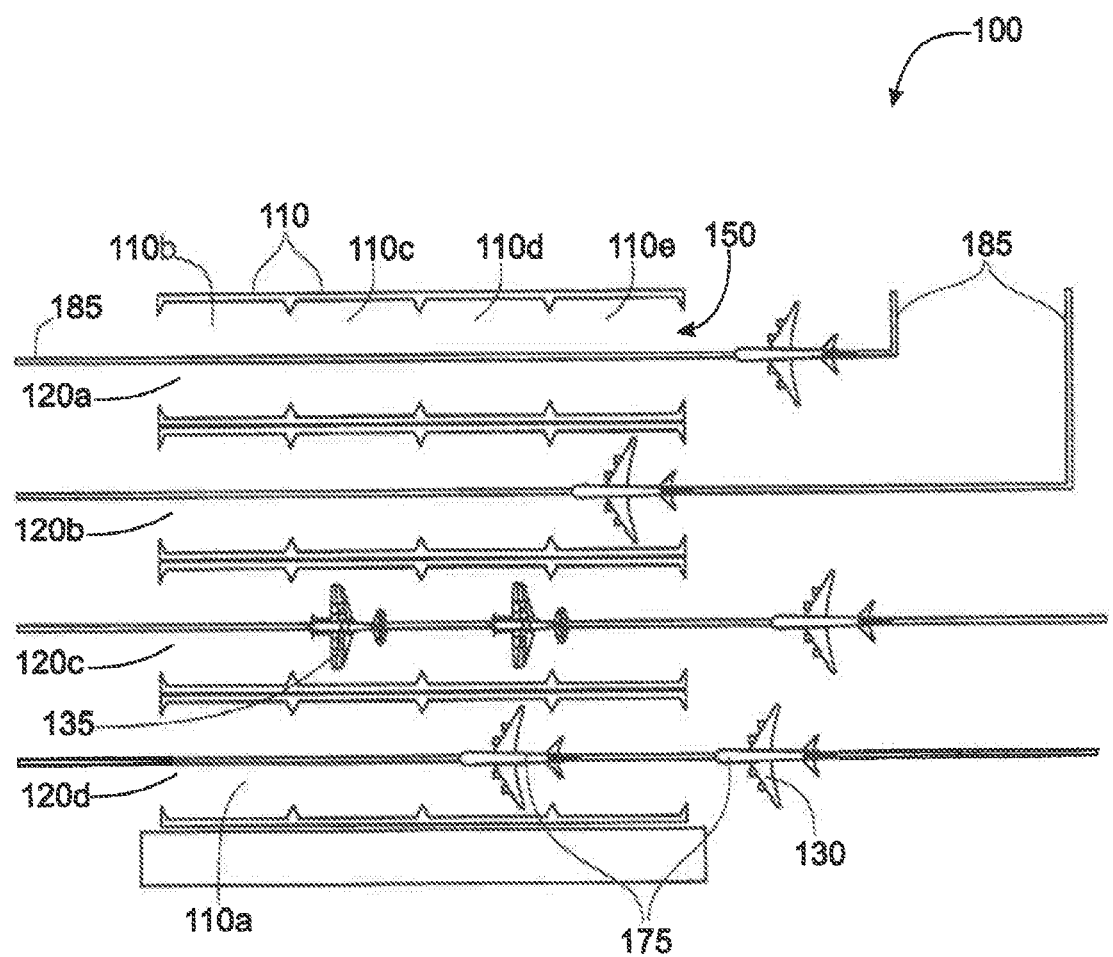
FIG. 7 is a schematic view of the integrated, multi-level airport terminal system in accordance to one of several preferred embodiments.
Figure 8:
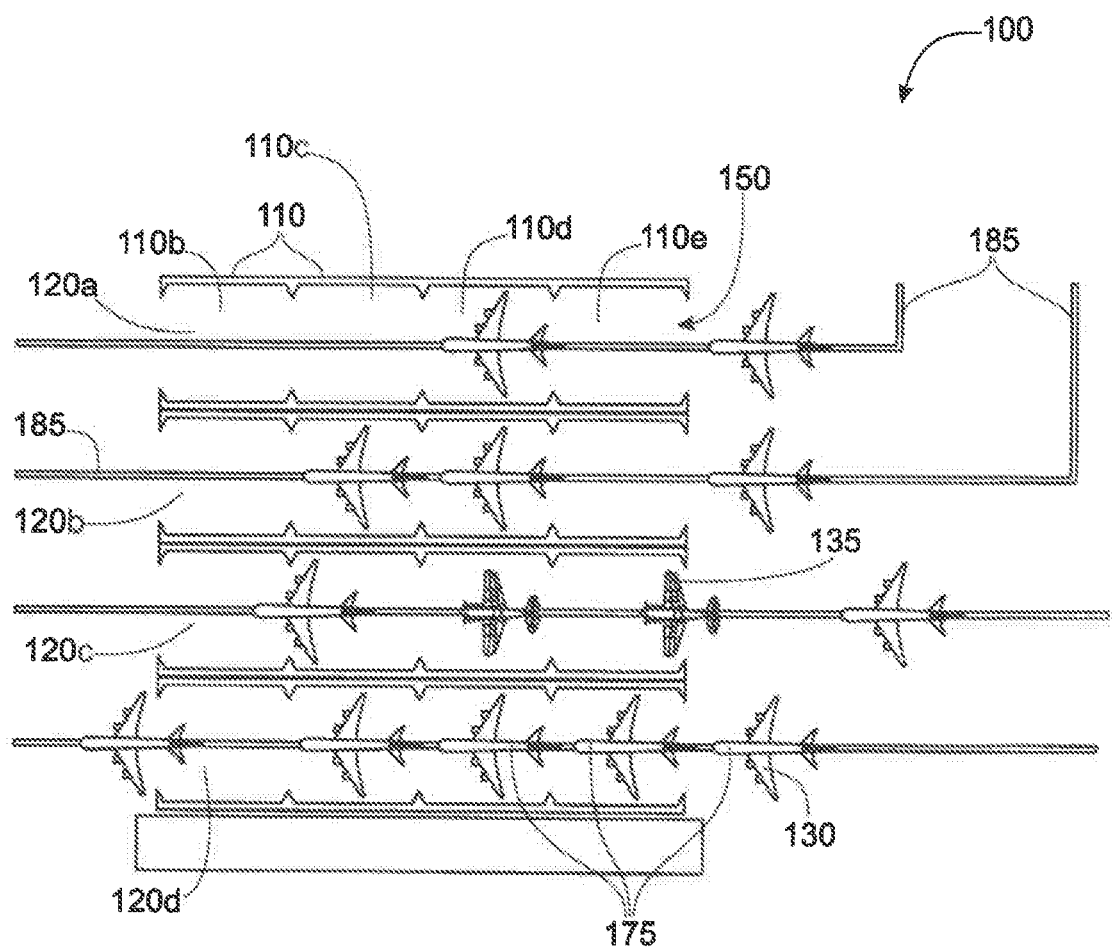
FIG. 8 is a schematic view of the integrated, multi-level airport terminal system in accordance to one of several preferred embodiments.
Figure 9:
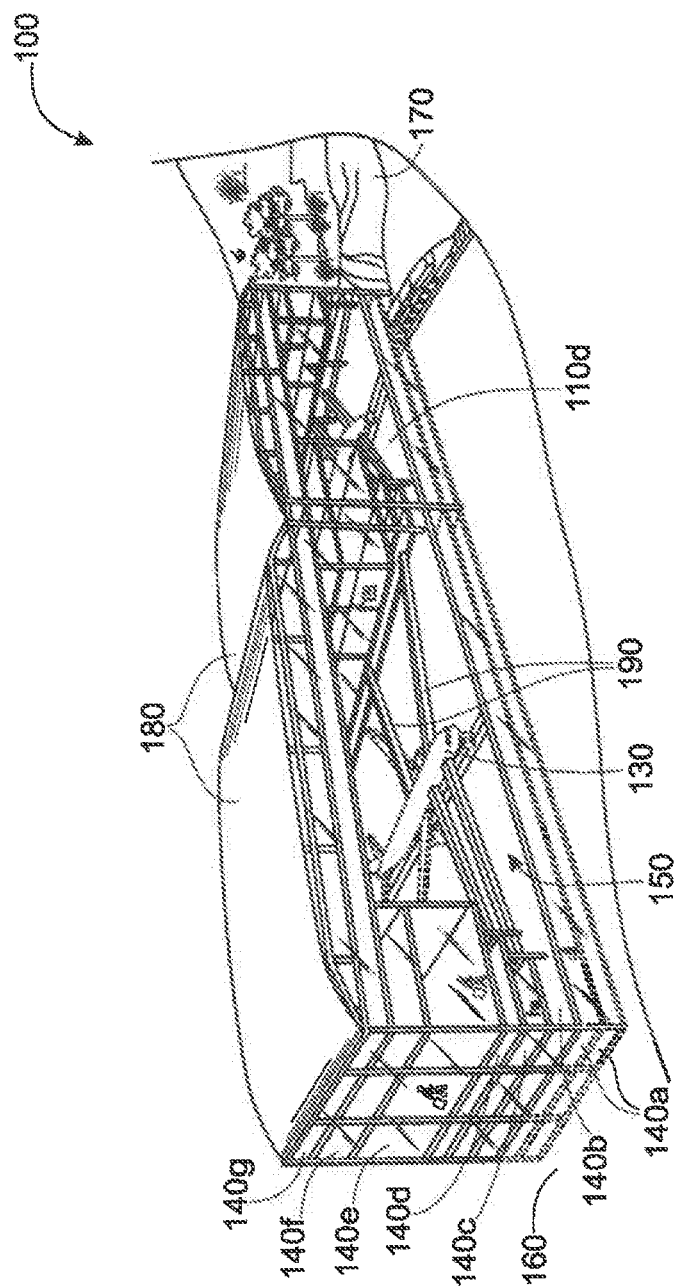
FIG. 9 is a perspective view of the integrated, multi-level airport terminal system in accordance to one of several preferred embodiments.

As shown in the accompanying drawings, the present invention of an integrated, multi-level airport terminal system 100 has a plurality of cells 110. More specifically, as illustrated in FIG. 1, at least two of the cells 110 of the plurality of cells 110 are disposed in an adjoining relation to one another. The adjoining relation of cells 110 with respect to each another allows the cells 110 positioned next to each other to remain within a close relation, supporting the integrated characteristics of the integrated, multi-level airport terminal system 100. Referring now to FIG. 2, FIG. 7 and FIG. 8, in one of the many several embodiments of the integrated, multi-level airport terminal system 100, the plurality of cells 110 are disposed in the adjoining relation to one another to further define at least one row 120. Each row 120 can include a set of two adjoining cells 110. Alternatively, in other preferred embodiments, each row 120 may include at least four adjoining cells 110. The plurality of cells 110 incorporating at least four cells 110 are disposed in the adjoining relation to one another to define at least one row 120.

Referring back to FIG. 7 and FIG. 8, a row 120a of four adjoining cells 110 can be disposed in a corresponding relation to another row 120b of four adjoining cells 110. Therefore, the four adjoining cells 110 within one row 120a can be in a corresponding relation to a set of four adjoining cells 110 within another row 120b. Accordingly, in one of the many preferred embodiments and merely as an example, the integrated, multi-level airport terminal system 100 can include sixteen cells 110, the sixteen cells 110 can be further apportioned into four rows 120, wherein each row 120 includes a set of four cells 110. Again, each group of four cells 110 are disposed in an adjoining relation to one another 110. The adjoining relation of cells 110 in relation to one another 110 allows at least one aircraft 130 to transit through an internal environment 110a of each of the cells 110. The adjoining relation of each 1 cell 110 in relation to one another 110 can allow at least one aircraft 130 to transit from the internal environment 110a of one adjoining cell to the internal environment 110a of another adjoining cell 110.

Alternatively, in one of the other preferred embodiments, as shown in FIG. 8, the adjoining relation of each cell 110 in relation to one another 110 can allow a plurality of aircraft 130 to transit contemporaneously within each row 120. More specifically, the adjoining relation of each cell 110 in relation to another 110 allows a plurality of aircraft 130 to successfully transit through the internal environments 110a of each of the adjoining cells 110 within the same row 120. Therefore, as it may be appreciated by those skilled in the art, the adjoining relation of cells 110 in relation to each other conveniently addresses a multitude of issues currently in the prior art, including the one related to airport capacity.

Moving further, as shown in FIG. 2, at least one of the cells 110 of the integrated, multi-level airport terminal system 100 can specifically include structural and operative features supporting transiting of at least one aircraft 130, including deplaning and enplaning of passengers. At one of the other cells 110 may include features supporting cargo services. Yet another cell 110 may include features supporting maintenance of the aircraft or refuelling. As such, in one of the many preferred embodiments, each cell 110 may include specific structural and operational features that contribute towards the overall transiting requirements of at least one aircraft 130. For instance, the first cell 110 adjoining to the second cell 110 within the same row 120a can include structural and operational features such as refuelling or cargo services.

Accordingly, each of the adjoining cells 110 within each row 120a, 120b, 120c, 120d can include specific structural and operational features that may sufficiently provide services related to transiting at least one aircraft 130. Alternatively, as shown again in FIG. 2, in 1 one of the several other preferred embodiments, each cell 110 within the row 120a may comprehensively include all the structural and operational features sufficiently contributing towards the transiting services of at least one aircraft 130. These comprehensive services may include, but are not limited to cargo, deplaning of passengers, enplaning of passengers, catering, fuel, maintenance, etc. As such, all the aforesaid services can be accomplished within one cell 110 rather than a plurality of cells 110 in a sequenced arrangement or order within each of the respective rows 120a, 120b, 120c 120d of the integrated, multi-level airport terminal system 100. Therefore, regardless of the plurality of preferred embodiments as stated, the adjoining relation of each cell 110 in relation to the one another 110 within each row 120a, 120b, 120c, 120d along with the corresponding relation of one row 120a in relation to another row 120b, 120c, 120d may greatly contribute towards the integration characteristics of the airport terminal system 100.

Figure 3:
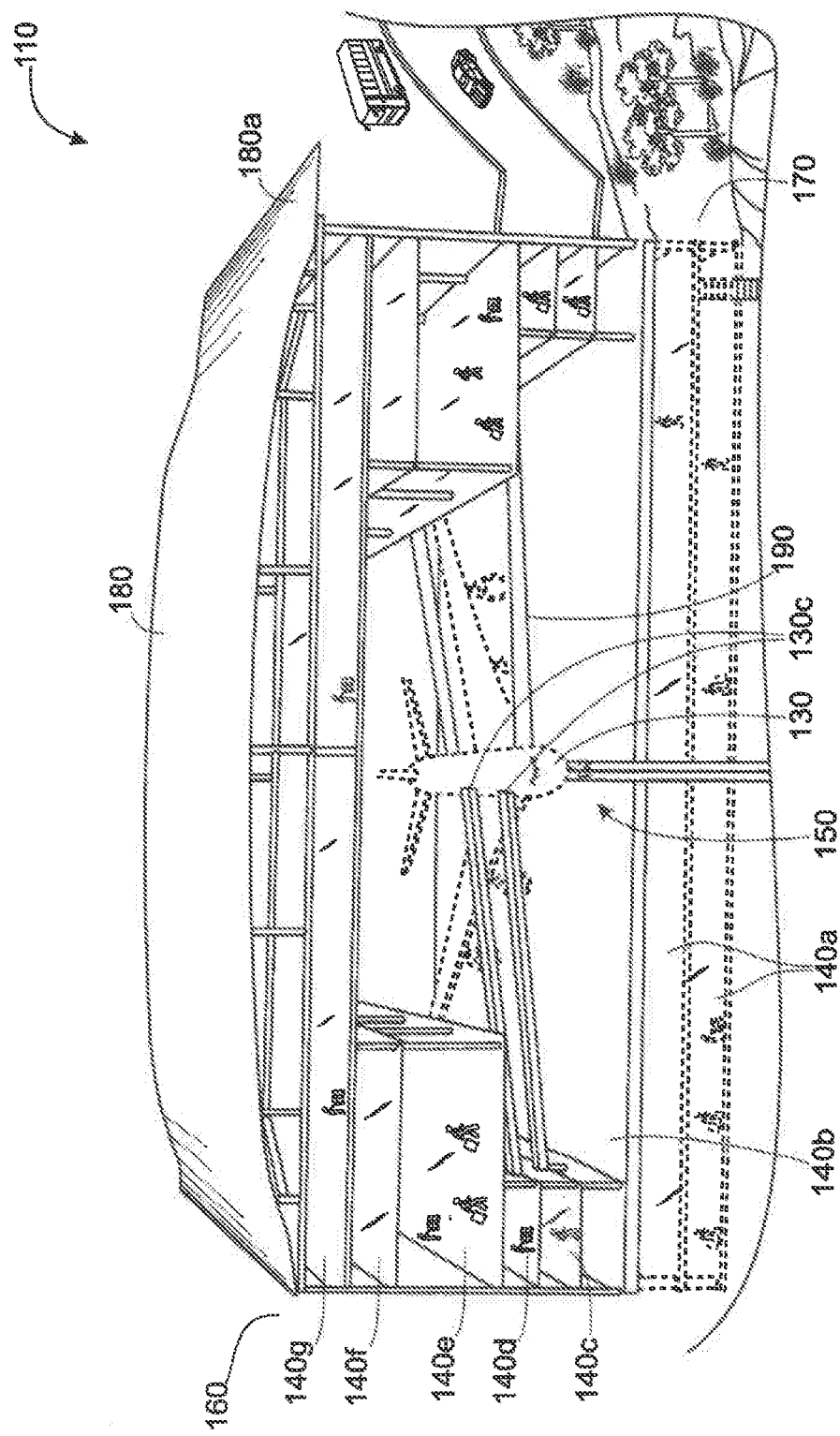
FIG. 3 is a top plan view of the integrated, multi-level airport terminal system in accordance to one of several preferred embodiments.
Figure 4:
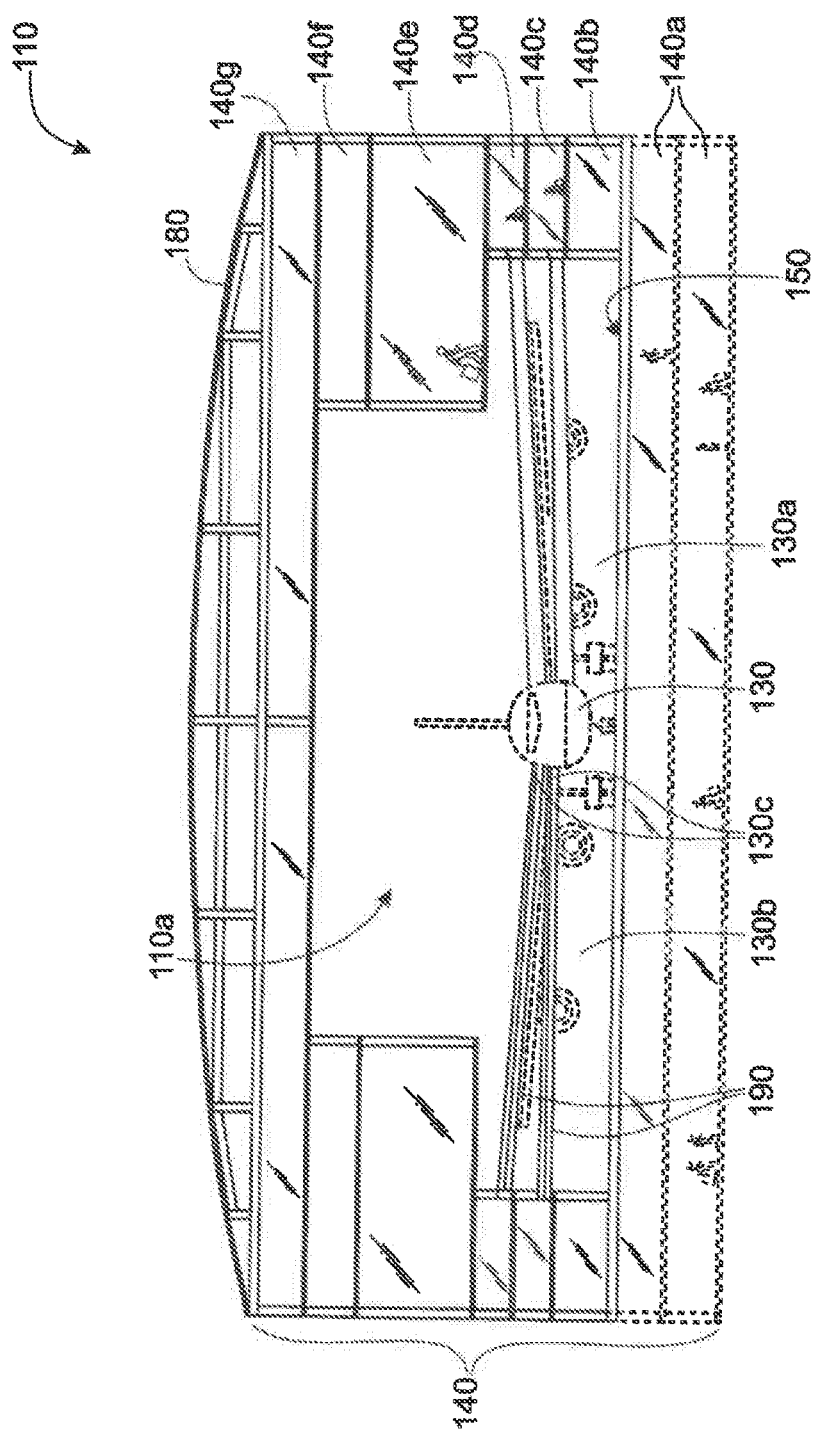
FIG. 4 is a front view of the integrated, multi-level airport terminal system in accordance to one of several preferred embodiments.
Figure 5:
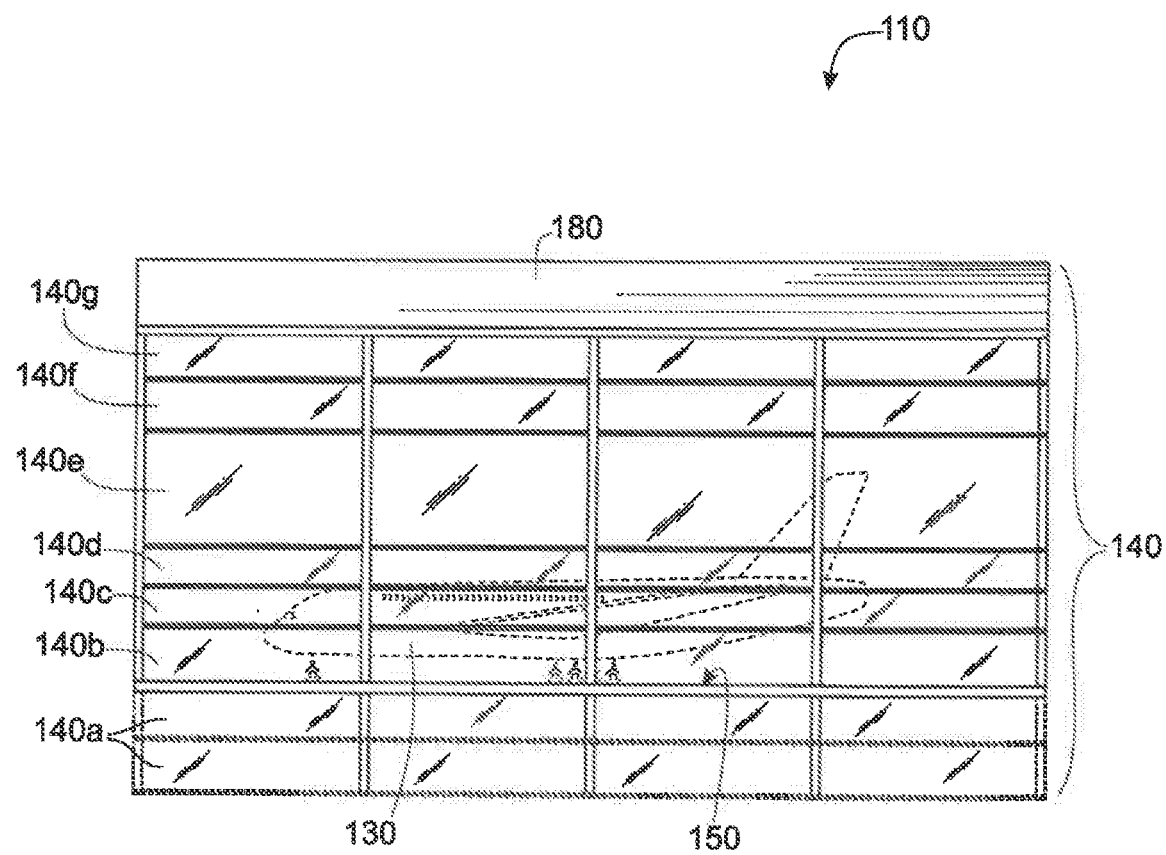
FIG. 5 is a side view of the integrated, multi-level airport terminal system in accordance to one of several preferred embodiments.

Referring now to FIG. 3 and FIG. 4, in one of the many preferred embodiments, each of the plurality of cells 110 of the integrated, multi-level airport system 100 includes a plurality of levels 140. As shown in greater detail in FIG. 4, the plurality of levels 140 may include multiple levels including, but not limited to: underground level 140*a*, ground level, 140*b*, a first level 140*c*, a second level 140*d*, a third level 140*e*, a fourth level 140*f*, fifth level 140*g*, etc. The integrated, multi-level airport system 100 may also include a ground level 140*b*, and at least one underground level 140*a* below the ground level 140*b*. Each of the plurality of levels 140 of each of the plurality of cells 110 may vary in number based on the plurality of the operational demands and size of the integrated, multi-level airport terminal system 100. For instance, and as shown in further detail in FIG. 3, in one of the several preferred embodiments, the underground level 140*a* may include two underground levels 140*a*, wherein one of the underground levels 140*a* is superimposed on the other. One of the underground levels 1 140*a* may include services related to baggage claim whereas one of the other underground levels 140*a* may include services related to transfer hall. Likewise, each of the plurality of levels 140 within each of the plurality of cells 110 may also vary and be disposed with individualized or multiple operational areas within the integrated, multi-level airport system 100.

There is no limitation as to how each of the plurality of levels 140 can be disposed within the various preferred embodiments. Accordingly, a person skilled in the art may also understand and appreciate that there is no limitation as to how many levels 140 each of the plurality of the cells 110 can include. For instance, the ground level 140*b* can be structured and disposed for transiting and accommodating at least one entire aircraft 130 irrespective of its size, type, shape, and other variances. Similarly, the plurality of levels 140 can be customized and utilized for a singular operational service related to transiting of the aircraft 130, or alternatively, a multitude of operational processes related to aircraft 130 transiting.

Figure 6:
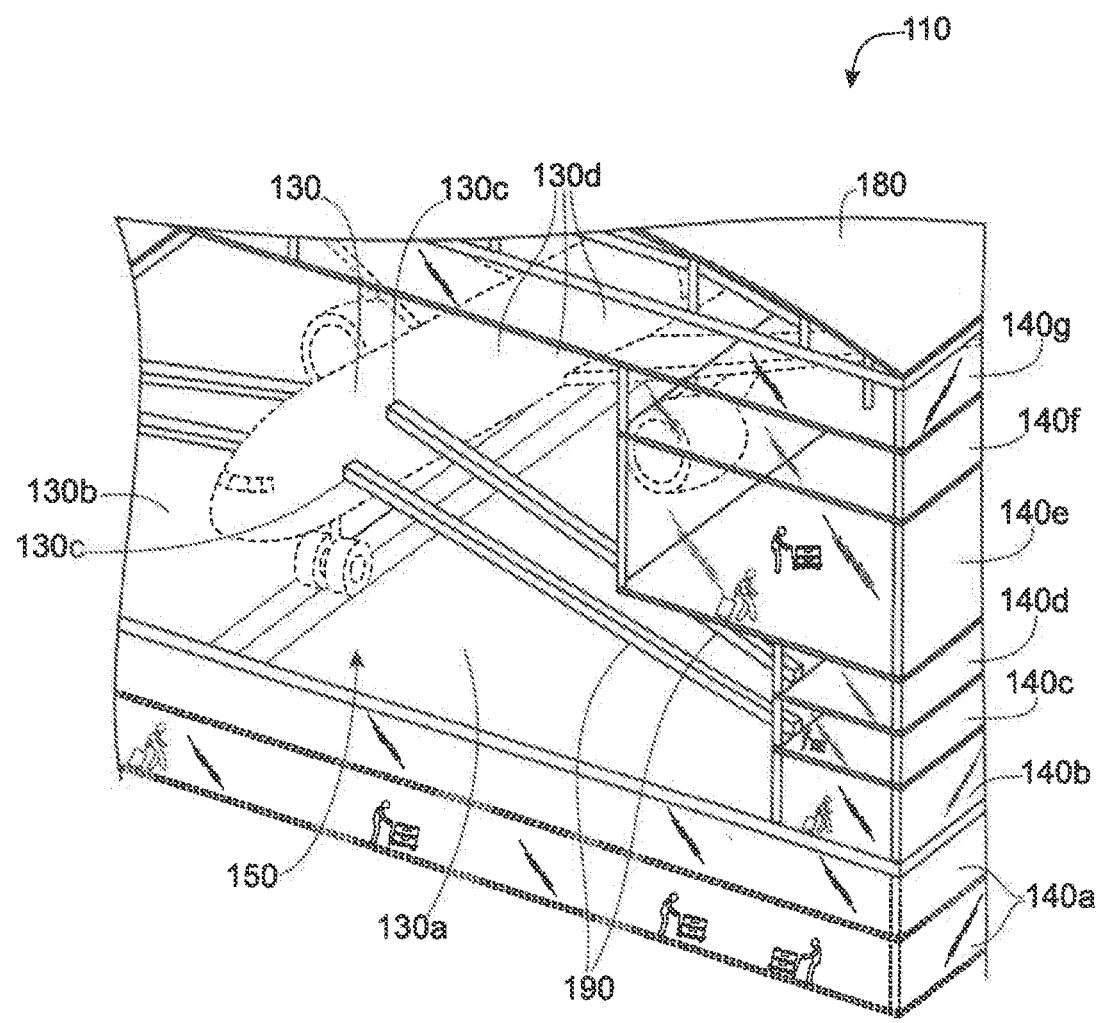
FIG. 6 is a top side view of the integrated, multi-level airport terminal system in accordance to one of several preferred embodiments.

Referring now to FIG. 3, FIG. 4, and FIG. 6, when the aircraft 130 is transiting within the internal environment 110*a* of at least one cell 110, the first level 140*c* or one of the lower levels 140*b*, 140*c* of the cell 110 on a "port side" 130*a* of the aircraft 130 can be used as departure area primarily for enplaning passengers on the upper level and lower level (not shown) of the aircraft 130. Conversely, the first level 140*c* of the cell 110 on the other side of the one cell 110 can be utilized as a designated arrivals area on a "starboard side" 130*b* of the aircraft 130 primarily for deplaning passengers from the upper and lower level of the aircraft 130.

Structurally, the first level 140*c* or other lower levels 140*b*, 140*c* of the one cell 110 are disposed on each side 130*a*, 130*b* of at least one transiting aircraft 130 within the internal environment 110*a* of at least one cell 110. Having the plurality of levels 140 within each cell 110 disposed on either side 130*a*, 130*b* of the transiting aircraft 130 within the 1 internal environment 110*a* of at least one cell 110 allows for the transiting aircraft 130 to be engaged in a plurality of operational processes.

While some amount of variation within each of the plurality of levels 140 is possible, one skilled in the art may also understand and appreciate that certain preferred embodiments of what each of the plurality of levels 140 may specifically function as will be best suited in maintaining the standardization of the integrated, multi-level airport terminal system 100. As such, it is possible that some of the levels 140 within each cell 110 as disclosed herein may be structured and disposed for providing specific preferred operational process or processes only.

Accordingly, referring to FIG. 4 and FIG. 6, in one of many several preferred embodiments, the plurality of levels 140 may also be disposed below the ground level 140*b*. The plurality of levels 140 can include at least one underground level 140*a*, below the ground level 140*b*, within each of the plurality of cells 110. Each of at least one underground level 140*a* can be utilized for specific operational processes. For instance, as shown in greater detail in FIG. 4, in one of the many preferred embodiments, the integrated, multi-level airport system 100 may include two underground levels 140*a*. One of the underground levels 140*a* may be designated area for baggage claim, whereas one of the other underground levels 140*a* can serve as ground transportation area or passenger arrival pickup area.

As shown in FIGS. 3 and 4, the integrated, multi-level airport terminal system 100 also has a plurality of movable connectors 190. The moveable connectors 190 are disposed on one of the lower levels 140*c* and on one of the upper levels 140*d* of at least one cell 110. Specifically, the movable connectors 190 are disposed within the internal environment 110*a* of at least one cell 110 on the lower level 140*c*. Similarly, the movable connectors 190 are also disposed within the internal environment 110*a* of at least one cell 110 on the 1 upper level 140*d*. The movable connectors 190 are integrated entirely within the cell's 110 internal environment 110*a*, thus allowing for connectivity with at least one aircraft 130, while it transits therein 110*a*.

Furthermore, the movable connectors 190 are further structured and disposed on each of the lower 140*c* and upper levels 140*d* of at least one cell 110 to provide at least temporary connectivity with a plurality of openings 130*c* disposed on the lower and upper levels of the transiting aircraft 130. More specifically, the movable connectors 190 are disposed in a temporarily connecting relation with the interior environment of the transiting aircraft 130 on each side 130*a*, 130*b* of the transiting aircraft 130 on each of the lower 140*c* and upper 140*d* levels of at least one cell 110. The connectivity between the movable connectors 190 and the various levels of the transiting aircraft 130 enables passengers to freely move between the interior environment of the aircraft 130 and each of the upper 140*d* and lower levels 140*c* of the cell 110. In addition, since the movable connectors 190 are integrated within the internal environment 110*a* of the cell 110, all movement of passengers between the transiting aircraft 130 and the levels 140*c*, 140*d* of the cell 110 contributes towards the integration characteristics of the airport terminal system 100 of the present invention.

Referring now to FIG. 3, FIG. 4, and FIG. 6, in one of many preferred embodiments, each of the plurality of movable connectors 190 are disposed in a communicating relation with each one of a plurality of aircraft seating zones 130*d* of the transiting aircraft 130 for allowing passengers to move between the transiting aircraft 130 and lower 140*c* and upper 140*d* levels of at least one cell 110. When the plurality of movable connectors 190 temporarily connect with a plurality of openings 130*c* (exit or entrance doors) on each of the port side 130*a* and the starboard side 130*b* of the transiting aircraft 130 and each of the lower and upper levels of the transiting aircraft 130, the movable connectors 1 190 are structured and disposed to communicate with each of the plurality of aircraft seating zones 130*d* of the transiting aircraft 130 to allow passengers to freely move between the transiting aircraft 130 and each of the lower 140*c* and upper 140*d* levels of at least one cell 110. Each of the plurality of movable connectors 190 allow passengers arriving into and departing from various aircraft seating zones 130*d* within the interior of the transiting aircraft 130 to move freely between the arrivals area and departures area located on the lower 140c and upper 140d levels of at least one cell 110.

More specifically, each of the plurality of aircraft zones 130d are determined by the seating positions of the passengers within the transiting aircraft 130. When the plurality of movable connectors 190 temporarily connect with the plurality of openings 130c (exit or entrance doors) on each of the lower and upper levels of the transiting aircraft 130 and communicate with the interior or interior environment of the transiting aircraft 130, the arriving or departing passengers can move freely through the movable connectors 190 between the interior environment of the transiting aircraft 130 and each of the levels 140c, 140d of at least one cell 110. For instance, the passengers exiting the transiting aircraft 130 within the designated aircraft zone 130d would depart the aircraft 130, moving through one of the movable connectors 190 connected and communicating with the exit or entrance door nearest to the aircraft seating zone 130d, leading onto the arrivals area on one of the lower 140c or upper 140d levels of the cell 110.

Similarly, the passengers inside the departures area on one of the lower 140c or upper levels 140d of the cell 110 would move through one of the movable connectors 190 designated for the particular aircraft seating zone 130d, entering into the transiting aircraft 130 to claim their respective seats within a particular grouping. The entering passengers from the departures area of one of the lower 140c or upper 140d levels of the cell 110 would enter into the transiting aircraft 130 through the movable connectors 190 disposed on the lower 1 140c and upper 140 levels of the cell 110 on the port side 130a of the aircraft 130. However, to exit out, passengers of the transiting aircraft 130 would motion through the movable connectors 190 disposed on the lower 140c or upper 140d levels of the cell 110 on the starboard side 130b of the transiting aircraft onto to the arrivals area of one of the lower 140c or upper 140d levels of the cell 110.

Referring now to FIG. 1, FIG. 2, and FIG. 3 in one of several embodiments, the integrated, multi-level airport system 100 further includes at least one ramp member 150. As shown partially in FIG. 7 and FIG. 8, each of the ramp members 150 are connected to at least one landing and take-off taxiway or runway 185 on the airside 160 of the integrated, multi-level airport terminal system 100. The connectivity of each ramp member 150 with each of the plurality of taxiways 185 contributes towards a smooth transition, when the aircraft is transiting in and out of the airport terminal system 100. When at least one aircraft 130 arrives at the airport terminal system 100, it typically taxis on one of the designated runways or taxiways 185 until it is guided to at least one of the ramp members 150 by the airport terminal system's 100 ground control authorities. The determination of the precise ramp member 150 the aircraft 130 will be directed towards is made by the ground traffic control authorities depending on many factors such as landing times of the aircraft, enplaning/deplaning times of the aircraft, overall traffic within each row 120 and each cell 110 of the airport terminal system 100, etc.

As shown in FIG. 1, FIG. 2, and FIG. 3, in one of the many preferred embodiments, at least one of the ramp members 150 is disposed through each of the plurality of cells 110 for transiting at least one aircraft 130 through at least one cell 110. The one ramp member 150 is disposed through an internal environment 110a of each of the plurality of cells 110 for transiting at least one aircraft 130. More specifically, the ramp member 150 is structured and disposed through the internal environment 110a of each of the plurality 1 of cells 110 for providing a route for at least one aircraft 130 to transit within the internal environment 110a of each of the plurality of cells 110. The internal environment 110a of each of the plurality of cells 110 is structured to accommodate the entire transiting aircraft 130. The structure of each of the cell 110 and each of its internal environment 110 therein do not discriminate against the size, shape, type of the aircraft and can adopt to a plurality of aircraft 130 present in the aviation industry.

Essentially, as shown in FIG. 7 and FIG. 8, each of the plurality of cells 110a is structured and disposed to accommodate and transit aircraft 130 of all sizes—from large commercial airliners 130 to smaller business or personal propeller aircraft 135.

Referring now to FIG. 3, FIG. 7, and FIG. 8, the ramp member 150 is disposed through the internal environment 110a for transiting at least one aircraft 130 through at least one of the plurality cells 110 in a sequential and linear arrangement 175. The sequential and linear arrangement 175 in which the aircraft 130 transit through the integrated, multi-level airport terminal system 100 depends on several factors, including but not limited to ramp member 150 time, transit time status of the aircraft 130 (originating, transiting or transfer), space availability of cells 110, and position of other transiting aircraft 130 within each of the cells 110. Additionally, the sequential and linear arrangement 175 allows at least one aircraft 130 disposed on the ramp member 150 to transit from one cell 110 to another 110, thus allowing the at least one aircraft 130 to enter into the internal environment 110a of the cell 110 within the row 120. Merely as an example and as shown in FIG. 7, in one of the many preferred embodiments, if each row 120a, 120b, 120c, 120d includes four cells 110a, 110b, 110c, 110d, and at least one aircraft 130 is authorized by the ground and operations control authorities into a particular cell 110b within one 120a of the plurality of rows 120, the aircraft 130 can be guided therein by entering into the internal environment 110a of one designated 1 cell 110e at the end of the row 120a, move through the internal environment 110a of first cell 110e, enter into the internal environment 110a of the second cell 110d, adjoining the first cell 110e within the row 120a, then move through the internal environments 110a of third cell 110c adjoining the second cell 100d, thereby finally transiting into its destination cell 110b within the designated row 120a. Additionally, as shown in FIG. 7, there may be no other transiting aircraft 130 in other cells 110b, 110c, 110e, within one of the rows 120d and at least one aircraft 130 may simply be transiting within one 110d of the four cells 110b, 110c, 110e within one of the rows 120d. As such, the designation of cell 110 and row 120 can be based on other factors, including the possibility that the aircraft may be an originating aircraft 130 from the city, where the integrated, multi-level airport system 100 is located.

Alternatively, however, as shown in FIG. 8, there may be a plurality of aircraft 130 transiting within each of the internal environments 110a of the cells 110b, 110c, 110d, 110e within the rows 120a, 120b, 120c, 120d of the integrated, multi-level airport terminal system 100. Again, the designated position of aircraft 130 within the internal environments 110a of each of the cells 110b, 110c, 110d, 110e of each row 120a, 120b, 120c, 120d is determined by the authorities based on aforesaid numerous factors. Furthermore, referring back to FIG. 1, FIG. 2, and FIG. 3, the integrated, multi-level airport terminal system 100 can be divided into landside 170 and airside 160 areas. The landside 170 areas include parking lots, public transportation, train stations, natural landscape, and access roads. The airside 160 areas include all areas accessible to aircraft, including a plurality of runways or taxiways 185 and ramp members 150.

As shown in FIGS. 1, 2 and 3, the integrated, multi-level airport terminal system 100 further includes a roof member 180. The roof member 180 is disposed on each of the plurality of cells 110 to arrange from a landside 170 direction of the integrated, multi-1 level airport terminal system 100 to an airside 160 direction of the integrated, multi-level airport system 100. More specifically, the roof member 180 is structured in a wave-like arrangement from the landside 170 area of the integrated, multi-level airport terminal system 100 to the airside 160 area of the integrated, multi-level airport terminal system 100. The roof member has a provision (not shown) for natural top light to penetrate the lower levels and the upper levels of the integrated, multi-level airport terminal system 100, giving great visibility in all directions of each cell 110.

Moreover, in one of the many preferred embodiments, the roof member 180 is further structured to have clear panels (not shown) disposed throughout its surface area, giving passengers spectacular views of the integrated, multi-level airport terminal system 100, take-off and landing of aircraft 130, as well as the transiting of aircraft 130 at respective arrival and departure areas in lower 140*c* and upper levels 140*d* of each of the plurality of cells 110. Furthermore, in one of the many preferred embodiments, the roof member 180 is insulated against hot and cold outside air temperatures to reduce the air-conditioning and heating loads, while providing efficient thermal control of the integrated, multi-level airport terminal system. The roof member's 180 insulation also assists in meeting the zero carbon standard required with the internal environment of the airport terminal system. The roof member 180 incorporates solar panels (not shown) converting natural sun light into useful energy, supplementing the airport terminal's 100 energy source, thereby reducing the demand for and external electric source for power. Additionally, as shown in FIG. 1, FIG. 2, FIG. 3, the roof member 180 is structured and disposed to have an overhang member 180*a*. The overhang member 180 is disposed on each cell 110 on the landside 170 of the airport terminal system 100 for providing shade to all of the transparent frontage of each cell 110 of the integrated, multi-level airport terminal system 100. The overhang member 180*a* is 1 also structured to reduce the overall temperature of the internal environment 110*a* within each of the cells 110 during the hottest hours of the day.

Figure 10:
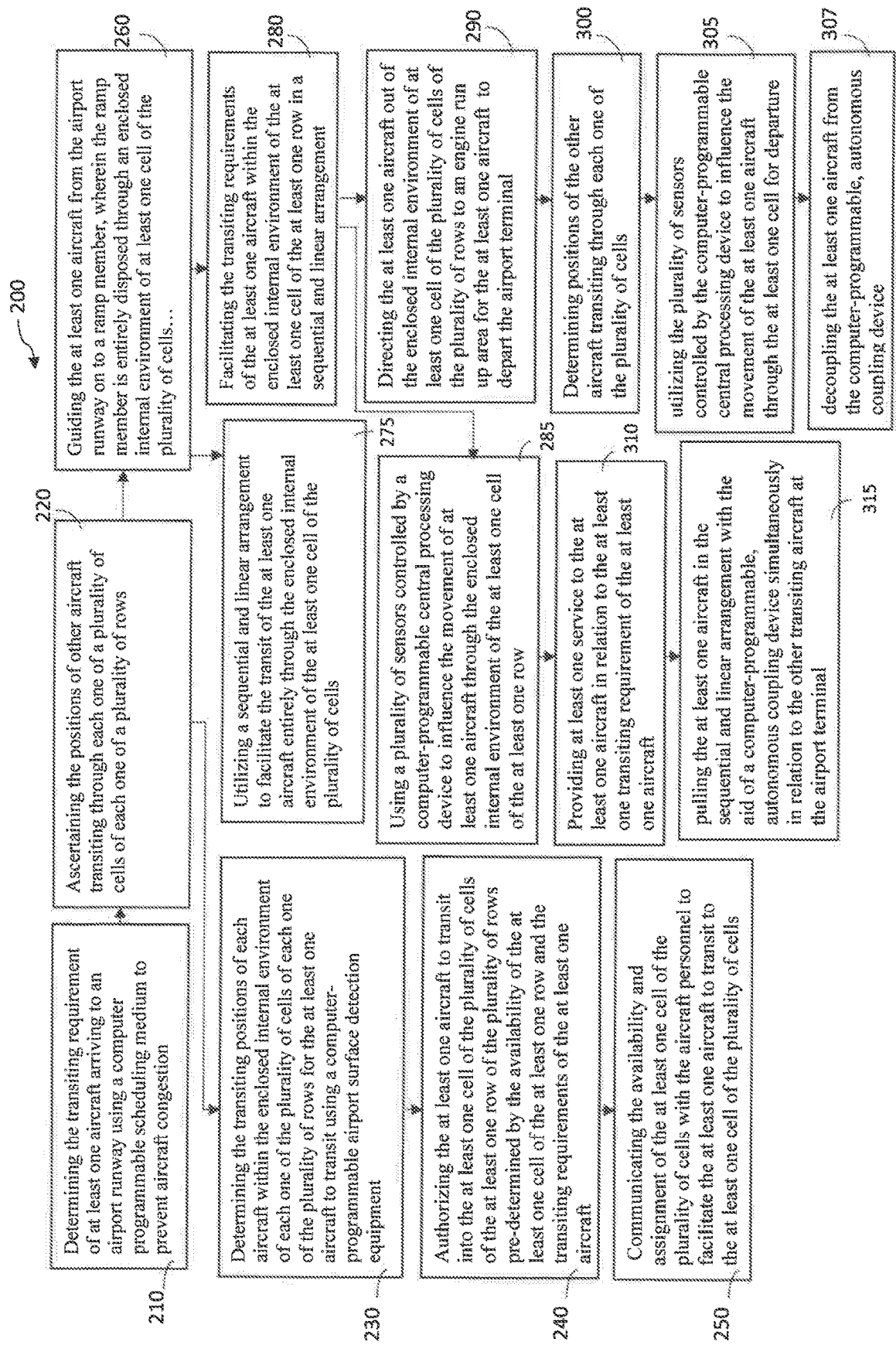
FIG. 10 is a flow chart of one of the methods of the integrated, multi-level airport terminal system in accordance one of several preferred embodiments.

As shown in FIG. 10, the method of transiting at least one aircraft arriving in and departing out of the integrated, multi-level airport terminal system 200 includes determining the transiting requirement of at least one aircraft arriving to an airport runway using a computer programmable scheduling medium to prevent aircraft congestion 210.

Referring again to FIG. 10, the method of transiting at least one aircraft arriving in and departing out of the integrated, multi-level airport terminal system further includes ascertaining the positions of other aircraft transiting through each one of a plurality of cells 220.

As shown in again in FIG. 10, ascertaining the positions of other aircraft 130 transiting through each one of the plurality of cells 110 further includes the method of determining the transiting positions of each aircraft within the internal environment of each one of the plurality of cells for the at least one aircraft to transit in at least one cell 230 and the method of authorizing at least one cell of the plurality of cells for the aircraft to transit determined by the cell availability and the transiting requirements of the aircraft 250.

More specifically, as shown in FIG. 7 and FIG. 8, once the ground control and flight operations authorities determine the transiting requirements of the arriving aircraft 130, the position of each of the other transiting aircraft 130 within the airport terminal system 100 is ascertained. An airport surface detection equipment (ASDE), which is not shown, locates precisely the positions of each transiting aircraft 130 within the internal environment 110*a* of each of the cells 110 using a graphical display. ASDE is effectively ran with the use of computer programming. The ground control and flight operations authorities are equipped with a search radar (not shown), which graphically displays each transiting aircraft 130 within each cell 110 of the integrated, multi-level airport terminal system 100. In addition, the authorities utilize a tower automated ground surveillance system (TAGS) (not shown), which is again not shown to display position of each aircraft 130 from a signal transmitted by each aircraft 130. The signal further reveals details of each aircraft 130 including each unique flight identifier in real time within each of the cells 110*b*, 110*c*, 110*d*, 110*e* of each row 120*a*, 120*b*, 120*c*, 120*d* of the airport terminal system 100.

Furthermore, referring to FIG. 10, the method of transiting at least one aircraft arriving in and departing out of the integrated, multi-level airport terminal system 200 further includes guiding the at least one aircraft from the runway on a ramp member through an internal environment of at least one cell of the plurality of cells 260. Each cell within each defined row of the airport terminal system can be marked or numbered in a distinct manner, allowing the ground control and operations authorities and aircraft 130 personnel to effectively communicate the position of the cell 110 within the integrated, multi-level airport terminal system. Once the communication is effectively made, the transiting aircraft can be successfully guided into the cell. While most aircraft are capable of facilitating ground movement on the taxiway under their own power, once the position of the cell for the transiting aircraft is determined and communicated with the aircraft personnel, the transiting aircraft can be towed on the ramp member 150, disposed through the internal environment 110*a* of the cell 110, with the aid of an external power (not shown). The external power may include, but is not limited to tractors, tugs, or other similar vehicles capable of using their power to successfully place the transiting aircraft 130 into motion and move it into its desired location on the ramp member 150.

Moreover, the method of guiding the aircraft from the runway on the ramp member through an internal environment of at least one cell of the plurality of cells 260 further includes utilizing a sequential and linear arrangement 175 to facilitate transit of at least one aircraft into the internal environment of at least one cell of the plurality of cells 275. As shown in greater detail in FIGS. 7, 8 and 10, the sequential and linear arrangement 175 of the aircraft 130 provides priority and organization of aircraft 130 transiting into the airport terminal system 100. The sequential and linear arrangement 175 allows the transiting aircraft 130 to strategically position within each respective cell 110*b*, 110*c*, 110*d*, 110*e* of each respective row 120*a*, 120*b*, 120*c*, 120*d* based on several determining factors as previously mentioned.

Furthermore, the transiting aircraft 130 are sequentially positioned within at least one cell 110*b*, 110*c*, 110*d*, 110*e* of at least one row 120*a*, 120*b*, 120*c*, 120*d* of the airport terminal system 100 to avoid congestion and smooth flow of traffic within the airport terminal system 100. The sequential and linear arrangement 175 of aircraft 130 within the integrated, multi-level airport terminal system 100 allows transiting aircraft 130 to move effectively through each of the plurality of cells 110b, 110c, 110d, 110e within each of the rows 120a, 120b, 120c, 120d starting from arrival, to transit, and then departure. Typically, a transiting aircraft 130 with the quickest transiting turnaround may be sequenced in a cell 110 adjacent to another cell 110 with a transiting aircraft 130 with a relatively slower transiting turnaround and so on. Similarly, a transiting aircraft, which is an originating aircraft (aircraft originating from the location where the airport terminal system is physically located) may be sequenced in a different cell 110c of a different row 120b of the airport terminal 100 from a transfer aircraft 130 (arriving from another airport of another city to the airport terminal system) having to merely refuel and deplane and enplane transfer passengers on to their ultimate destination. Likewise, the sequential and linear arrangement 175 of the transiting aircraft 130 with a quicker departure time may be directed first out of the internal environment 110a of the cell 110 than the transiting aircraft 130 with a slower departure time in a different row 120b and different cell 110c from the transiting aircraft 130 with the quicker departure time. This efficiency in sequential and linear arrangement 175 promotes an ideal flow of transiting aircraft 130 in and out of the integrated, multi-level airport terminal system 100.

Referring again to FIG. 10, in one of the several preferred embodiments, the method of transiting at least one aircraft arriving in and departing out of the integrated, multi-level airport terminal system 200 further includes facilitating the transiting requirements of the at least one aircraft within the internal environment of at least one cell 280. The transiting requirement within the cell 110 may include, but are not limited to a plurality of operational process such as passenger enplaning and deplaning, cargo handling, cargo security, aircraft 130 maintenance, aircraft 130 fuelling, baggage transfers, baggage handling, lavatory, cleaning, cabin, catering, airport terminal 100 services, field operations, etc. Accordingly, when at least one aircraft 130 is guided to the cell 110 and thereby transits within the internal environment 110a of the cell 110, the transiting requirements on the aircraft 130 commence. The nature of the transiting requirements can be predetermined based on the information provided to the authorities of the airport terminal 100.

In other instances, additional transiting requirements can be supplemented after the aircraft 130 is inspected. As such, the operational processes within the cell's 110 internal environment 110a are determined by many factors, including the status of the aircraft 130 (destination, transfer or originating), ramp member 150 time, size of the aircraft 130, type of the aircraft 130, etc. So for instance, if the transiting aircraft 130 within the cell's 110 internal environment 110a is an originating flight, the operational processes related to that aircraft 130 may not include deplaning of passengers. However, if the transiting aircraft 130 within the cell's 110 internal environment 110a is a transfer or destination flight, the aircraft would be selected to the appropriate row 120(a-d) to be serviced.

Figure 11:
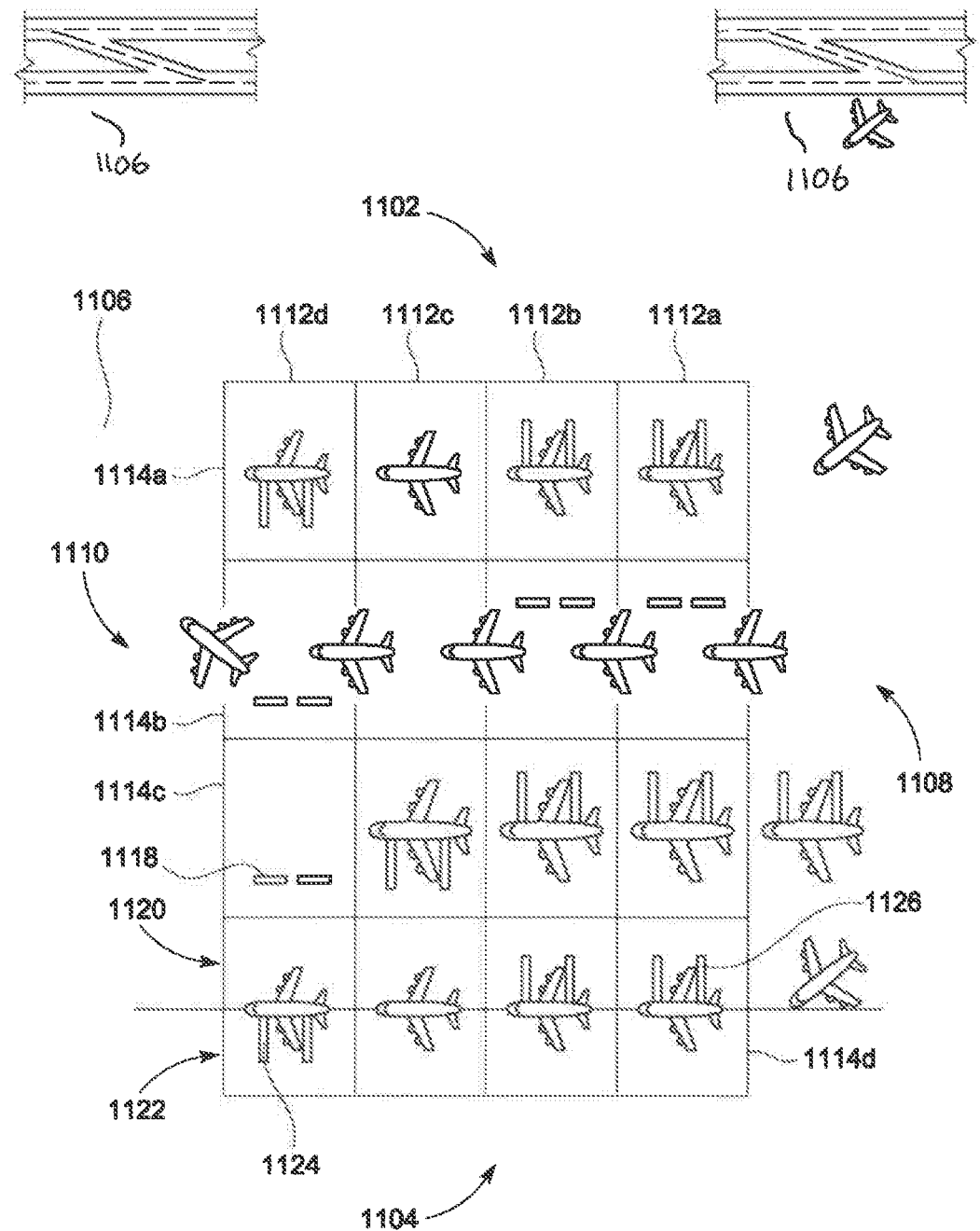
FIG. 11 illustrates method of transiting aircraft through the integrated multi-level airport terminal using an arrangement of a plurality of cells and rows in accordance one of several preferred embodiments.
Figure 12:
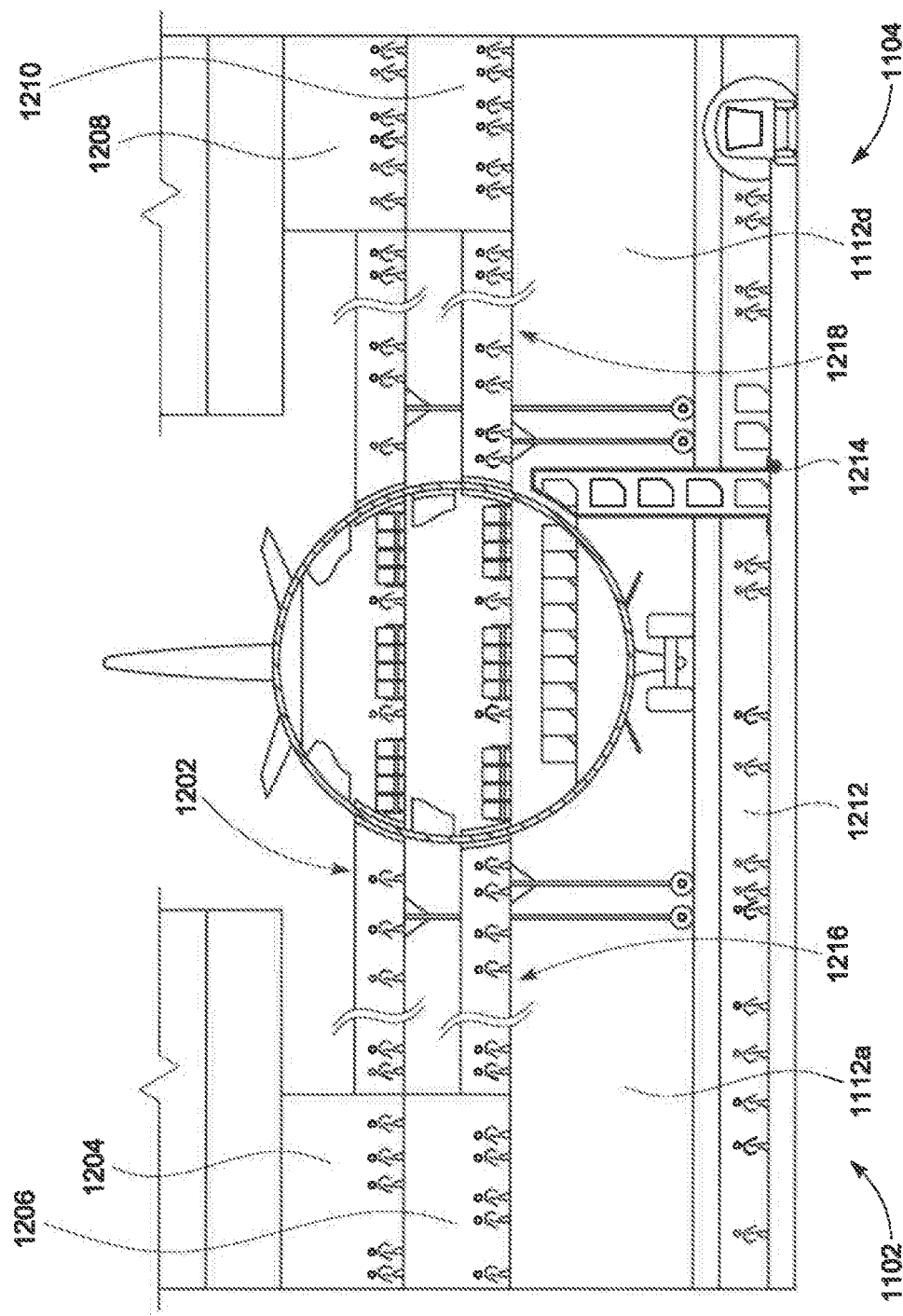
FIG. 12 illustrates method of transiting aircraft through the integrated multi-level airport terminal using moving connectors for emplaning and deplaning the passengers in accordance one of several preferred embodiments.

Referring to FIG. 10, FIG. 11 and FIG. 12, the method 280 of facilitating the transiting requirements of the at least one aircraft within the internal environment includes using a plurality of sensors 1118 controlled by a computer-programmable central processing device 1126 to influence the movement of at least one aircraft through the enclosed internal environment of the at least one cell of the at least one row 285. FIG. 10 also illustrates that the method 280 further includes providing at least one service to the at least one aircraft in relation to the at least one transiting requirement of the at least one aircraft 310. Finally, FIG. 10 refers to the method 280, which includes pulling the at least one aircraft in the sequential and linear arrangement with the aid of a computer-programmable, autonomous coupling device simultaneously in unison in relation to the other transiting aircraft at the airport terminal 315.

In of many other preferred embodiments, the method of facilitating the transiting requirements of the at least one aircraft within the internal environment may also include utilizing a plurality of movable connectors disposed on an upper level and a lower level on each side of at least one cell for facilitating movement of passengers into and out of the at least one aircraft 285. Specifically, as shown in FIGS. 3 and 4, the movable connectors 190 are disposed on the lower 140c and upper 140d level of at least one cell 110 allow passengers on the lower and upper level of the transiting aircraft 130 to enplane and deplane without requiring the passengers on the upper level of the transiting aircraft 130 to descend down to the lower level of the transiting aircraft 130, or alternatively, the passengers on the lower level of the transiting aircraft 130 to ascend up to the upper level of the transiting aircraft 130. Having the plurality of movable connectors 190 disposed on the lower 140c and upper 140d level of at least one cell 110 allows passengers to enplane the levels of the aircraft 130 directly from the upper 140d level and lower 140c level of the cell 130. The movement of passengers on the upper and lower level also decreases the overall enplaning or deplaning times of the transiting aircraft. Furthermore, the plurality of movable connectors 190 are located on the starboard side 130b or on the port side 130a of the transiting aircraft 130. Accordingly, in one of many preferred embodiments, passengers can board the transiting aircraft 130 from upper 140d and lower 140c level of the cell 110 onto the upper and lower level of the transiting aircraft 130 from the port side 130a of the aircraft. Conversely, the passengers can deplane from the upper and lower level of the transiting aircraft on to the upper 140d and lower 140c level of the cell 110 from the starboard side 130b of the transiting aircraft 130. As such, having efficiency in enplaning and deplaning times minimizes the risk of flight delays and accommodates for extra time that the aircraft 130 may need in other operational processes while transiting within the internal environment 110a of the cell 110.

Furthermore, as shown in greater detail in FIG. 1, FIG. 3, FIG. 4, and FIG. 6, the plurality of movable connectors 190 temporarily connect on the starboard side 130b or the port side 130a of at least one aircraft 130 for facilitating movement of passengers between the internal environment of the at least one aircraft 130 and each of the levels 140c, 140d on each side of at least one cell 110. Particularly, once the passengers have deplaned, only the service personnel have access to the plurality of movable connectors 190 on the starboard side 130b. Once the service tasks are completed by the personnel, the plurality of movable connectors 190 on the starboard side 130b are withdrawn as part of immigration and security protocols. Each of the movable connectors 190 allow passengers arriving into or departing from various aircraft seating zones 130d within the interior of the transiting aircraft 130 to move freely between the arrivals area or departures area located on the lower 140c and upper 140d levels of at least one cell 110 and the interior of the transiting aircraft. 130 The plurality of aircraft seating zones 130d can be determined by the designated seating positions of the passengers. Accordingly, when the movable connectors 190 are temporarily connected with the exit or entrance doors on each of the lower and upper levels of the transiting aircraft 130 and communicate with the interior of the aircraft 130, the arriving or departing passengers can move freely through the movable connectors 190 between the interior of the aircraft 130, and the departures and arrivals area located on the lower 140c and upper 140d level of the cell 110, primarily based on the aircraft seating zones 130d determined by each passenger's designated seats.

Once the transiting requirements on at least one aircraft 130 within the internal environment 110a of the cell 110 are fully completed, the aircraft 130 is authorized for departure by the ground control authorities. Referring to FIG. 10, when the aircraft is ready for departure out of the integrated, multi-level airport terminal system, the method of transiting at least one aircraft in and out of the integrated, multi-level airport terminal system 200 includes directing the at least one aircraft on the ramp member out of the internal environment of at least one cell of the plurality of cells for the aircraft departure 290. Particularly, as shown in greater detail in FIG. 7 and FIG. 8, the ground control and operations authorities determine the positions of other aircraft 130 presently transiting through each of the plurality of cells 110.

The method of directing the at least one aircraft on the ramp member out of the internal environment of at least one cell of the plurality of cells for the aircraft departure 290 includes determining positions of other aircraft transiting through each of the plurality of cells 300. Specifically, as shown in FIGS. 7 and 8, since multiple aircraft 130 may be ready for departure simultaneously or within close proximity of times, it is necessary for the authorities to coordinate proper movements of the aircraft 130 within each cell 110b, 110c, 110d, 110e of each row 120a, 120b, 120c, 120d. The authorities determine the positions of other transiting aircraft 130 within each of the cells 110b, 110c, 110d, 110e within each of the rows 120a, 120b, 120c, 120d. If no safety or obstruction issues are found, clearance for departure is granted. The aircraft 130 can then proceed with the aid of external power such as tugs or tractors (not shown) towards the airside 160 of the integrated, multi-level airport terminal system 100 in a sequential and linear arrangement 175.

After the positions are verified and at least one aircraft is authorized for departure based on its scheduled departure time, referring to FIG. 10, the method of directing at least one aircraft out of the internal environment of at least one cell of the plurality of cells for aircraft departure 290 includes utilizing the plurality of sensors 1118 controlled by the computer programmable central processing device 1126 to influence the movement of the aircraft through the cell for departure 305. In another preferred embodiment, FIG. 10 further illustrates the method of directing the at least one aircraft on the ramp member out of the internal environment of at least one cell of the plurality of cells for the aircraft departure which further includes decoupling the aircraft from the computer the computer programmable, autonomous coupling device 307.

The aircraft will be directed within the cell 110 of the row 120 based on a plurality of factors. As shown in detail in FIG. 3, FIG. 4, FIG. 7, and FIG. 8, in one of the many preferred embodiments, the aircraft 130 with quicker transit times at the airport terminal system 100 will be positioned in the cell closer to the airside 160 of the airport terminal system 100 than the aircraft in the cell 110 with slower transit times. This is to optimize the use of the airport terminal system 100. The sequential and linear arrangement 175 of aircraft 130 at the airport terminal system 100 further prevents congestion due to aircraft 130 traffic by allowing transiting aircraft 130 with quicker transit times to depart first from the airside 160 of the airport terminal system 100, where the runways 185 for departure are located. Any of the above methods may be completed in sequential and linear order in at least one preferred embodiment, though they may be completed in any other order in other preferred embodiments.

FIG. 11 illustrates method of transiting aircraft through the integrated, multi-level airport terminal using an arrangement of a plurality of cells and a plurality of rows as shown. The plurality of cells 1112 include a first cell, a second cell, a third cell and a final cell (1112a-d), and a plurality of rows 1114 include a first row, a second row, a third row and a final row (1114a-d) of the integrated, multi-level airport terminal having an air side 1102 and a land side 1104. An aircraft enters from a first side 1108 and exists from second side 1110 as shown. As an example, the first cell of the first row 1112a, 1114a receives an arrival of an aircraft from the taxiway, and deplanes the passengers and bags are unloaded. Depending on the aircraft's transiting requirement, it may be moved to the second cell for cleaning, to the third cell for refuelling and to the final cell to enplane passengers and loading on of bags before departure through the second side 1110 towards the taxi way. The sequential and linear arrangement allows the aircraft to strategically position within each respective cell (1112a-d) of each respective row (1114a-d) based on several determining factors previously mentioned. The movable connectors or passenger boarding bridges 1202 are in operational position at the time of enplaning and deplaning of the passengers. When not in use, the movable connectors 1202 may be shifted to the initial stowed position to allow the aircraft to move through the cells (1112a-d) without any hazards or restrictions. The transiting aircraft are sequentially positioned within each cell (1112a-d) of each row (1114a-d) of the airport terminal. Transiting a medium size aircraft turnaround time may simply change the length of stay in each of the cells to accomplish the respective tasks for the cells. With several rows (1114a-d) available, a combination of turnaround times can be accommodated thus giving the integrated, multi-level airport terminal a high degree of flexibility, in line with the business model employed by the airport operator. The airport terminal transiting time may be equally divided by the number of cells (112a-d), which determines how much service time is available for each cell 1112 activity.

The method includes of steps of pulling the aircraft through a series of cells where a series of servicing functions occur. First step includes, connecting to the aircraft at the old ramp position and pulling the aircraft through the first row 1114a into the first cell 1112a, triggering the second step of operations where passengers deplane, and baggage and cargo are removed. Passenger boarding bridges or movable connectors 1202 may take the passengers off the starboard side 1120 of the aircraft, while subterranean robots remove the igloos filled with baggage and cargo. Once this function is completed and sensors 1118 release the aircraft, at third step, moving the aircraft to the second cell 1112b where waste services remove toilet waste, recyclable materials, and replenish potable water and other cabin supplies. At fourth step, accessing the aircraft by cleaning crews through the starboard side 1120 doorways and remove any trash still in the cabin areas. At fifth step, following a sensor-controlled clearance pulling the aircraft into the third cell 1112c for fueling and baggage and cargo loading on board. At sixth step after the necessary sensor clearance, moving the aircraft into final cell 1112d to enplane passengers through the port side 1122 doorways to seating zones nearest to the movable connectors 1224 used to enter the aircraft. Once all passengers are situated, the flight crew have completed their checks, and ground control have given the clearance to move, at the seventh step, decoupling from the aircraft to allow for a tow tractor to pull the fully loaded aircraft out of the internal environment of the airport terminal to an engine run up area 1106 on an apron. A ramp towing vehicle (not shown) may couple to the aircraft or other towing systems could be utilized to complete this function. Other rows in the airport terminal may be servicing aircraft selected for either the same routine, or may be a longer turnaround time, depending on the scheduling requirements of the airline. In any given hour one can see multiple aircraft all moving uni-directionally through the terminal at differing speeds of operations, eventually to move out of the terminal to prepare to fly off. As an example, illustrated herein, on arrival of the aircraft, the moving connectors 1224 connect on starboard side 1120 at the first cell 1112*a* at the final row 1114*d* for deplaning of the passengers. And the moving connectors 1224 connect on port side 1122 at the final cell 1112*d* of the final row 1114*d* for enplaning of passengers as shown before the aircraft moves onto the airport runway again for its departure.

FIG. 12 illustrates the method of transiting aircraft through an integrated, multi-level airport terminal using a plurality of movable connectors 1202 for emplaning and deplaning the passengers. The movable connectors or the passenger boarding bridges 1202 connect on upper transfer level 1204 and the lower transfer level 1206 on either of the starboard side 1120 or the portside 1122 of the aircraft for transfer of the passengers. In some of the many preferred embodiments, steering wheels articulate the movement of the movable connectors 1202 in an operational position for deployment and in a stowing position for storage. As an example, illustrated herein, on arrival of the aircraft, the moving connectors 1202 connect on starboard side 1120 at the first cell 1112*a* for enplaning of the passengers. And the moving connectors 1202 connect on port side at the final cell 1112*d* for deplaning of passengers as shown. An upper level lounge 1208 and a lower level lounge 1210 is on the port side of the aircraft as shown. Passengers are transferred through an upper level transfer 1204 and a lower level transfer 1206. There is a lower level transfer hall 1212 where a robotic system 1214 is deployed for loading and unloading of bags or cargo at different levels. Arrivals is through the starboard doors 1216 of the first cell 1112*a* and the departure is through port doors 1218 at the final cell 1112*d* as shown. The airside 1102 and the landside 1104 of the terminal is illustrated. The method of transiting at least one aircraft is deployed as described elsewhere herein.

The significant advantage of this method is drastic improvement in efficiency, service and management of multiple aircraft and avoiding undue delays which happen in existing methods of transiting. Moreover, the method of transiting aircraft through the integrated multi-level airport terminal of the present invention builds upon the legacy designs of current airports, and would therefore, present little difficulty for today's architects, designers and builders to construct it in a reasonable amount of time, and at a relatively inexpensive cost, the method of transiting aircraft through the integrated, multi-level airport terminal also does not necessitate the addition of external supporting devices or apparatus to manipulate the positioning of transiting aircraft. Specifically, the method of the present invention does not require the unwarranted hassle of having to manipulate the overall position or orientation of the arriving or departing aircraft. This preserves transiting times and allows flights to stay on course as far as timely arrivals and departures are concerned. Therefore, the method of transiting aircraft through multi-level, integrated terminal does not require the help of rails, escalators, elevators, or other external means to support the orientation or positioning of transiting aircraft. Also, this method can service all aircraft types, from narrow body to medium, and wide body aircraft at same time. Implementation of this method is possible using existing infrastructural and operational abilities of the airport terminals globally without adding undue costs and structural complications or undermining aircraft or passenger safety in any way. Furthermore, the method serves the growing passenger numbers, prevents delays, cancellations and losing resources and time. The present method has promising potential to impact economy by making air travel efficient. The opening up of enplaning and deplaning processes is beneficial not only for the very discerning air travel passengers, but for the airport authority and airlines as well, adding comfort, safety and efficacy to the air-travel. Additionally, passengers could enjoy a longer time shopping or taking advantage of retail and concession outlets at the departure lounge area before boarding through a boarding bridge closest to their seating zone. Also, it reduces stress of passengers making connection to another aircraft.

In at least one of the preferred embodiments, the above methods may be exclusively performed, but in other preferred embodiments, one or more steps of the methods as described may be skipped. Although only a few preferred embodiments of this invention have been described in detail above, those skilled in the art will readily appreciate that many modifications are possible in the exemplary embodiments without materially departing from the novel teachings and advantages of this invention.

Furthermore, since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of transiting at least one aircraft arriving in and departing out of an integrated, multi-level airport terminal comprising:

determining at least one transiting requirement of at least one aircraft arriving to an airport runway using a computer-programmable scheduling medium to prevent aircraft congestion;

ascertaining the positions of all the other aircraft transiting through each one of a plurality of cells of each one of a plurality of rows;

guiding the at least one aircraft from the airport runway on to a ramp member, wherein the ramp member is disposed through an enclosed internal environment of at least one cell of the plurality of cells to accommodate the entirety of at least on aircraft;

facilitating the at least one transiting requirement of the at least one aircraft within the enclosed internal environment of the at least one cell of the at least one row in a sequential and linear arrangement; and directing the at least one aircraft out of the enclosed internal environment of at least one cell of the plurality of cells of at least one row of the plurality of rows to an engine run up area for the at least one aircraft to depart the airport terminal.

2. A method of transiting at least one aircraft arriving in and departing out of an integrated, multi-level airport terminal system as recited in claim 1, wherein the at least one transiting requirement comprises passenger enplaning services, passenger deplaning services, cargo handling services, cargo security services, aircraft maintenance services, aircraft fuelling services, baggage transfer services, baggage handling services, lavatory services, cleaning services, cabin services, catering services, airport terminal services and field operations services.

3. A method of transiting at least one aircraft arriving in and departing out of an integrated, multi-level airport terminal system as recited in claim 1, wherein ascertaining the positions of all the other aircraft transiting through each one of a plurality of cells of each one of a plurality of rows further comprising:
  determining the transiting positions of each aircraft within the enclosed internal environment of each one of the plurality of cells of each one of the plurality of rows for the at least one aircraft to transit using a computer-programmable airport surface detection equipment;
  authorizing the at least one aircraft to transit into the at least one cell of the plurality of cells of the at least one row of the plurality of rows pre-determined by the availability of the at least one cell of the at least one row and the at least one transiting requirement of the at least one aircraft; and
  communicating the availability and assignment of the at least one cell of the plurality of cells with the aircraft personnel to facilitate the at least one aircraft to transit to the at least one cell of the plurality of cells.

4. A method of transiting at least one aircraft arriving in and departing out of an integrated, multi-level airport terminal system as recited in claim 1, wherein guiding the at least one aircraft from the airport runway on to the ramp member, wherein the ramp member is entirely disposed through an enclosed internal environment of at least one cell of the plurality of cells to accommodate the entirety of at least on aircraft further comprising:
  utilizing a sequential and linear arrangement to facilitate the transit of the at least one aircraft entirely through the enclosed internal environment of the at least one cell of the plurality of cells.

5. A method of transiting at least one aircraft arriving in and departing out of an integrated, multi-level airport terminal system as recited in claim 1, wherein facilitating the at least one transiting requirement of the at least one aircraft within the enclosed internal environment of the at least one cell of the at least one row in the sequential and linear arrangement further comprising:
  using a plurality of sensors controlled by a computer-programmable central processing device to influence the movement of at least one aircraft through the enclosed internal environment of the at least one cell of the at least one row;
  providing at least one service to the at least one aircraft in relation to the at least one transiting requirement of the at least one aircraft; and
  pulling the at least one aircraft in the sequential and linear arrangement with the aid of a computer-programmable, autonomous coupling device simultaneously in relation to the other transiting aircraft at the airport terminal.

6. A method of transiting at least one aircraft arriving in and departing out of an integrated, multi-level airport terminal system as recited in claim 1, wherein directing the at least one aircraft out of the enclosed internal environment of at least one cell of the plurality of cells of at least one row of the plurality of rows to an engine run up area for the at least one aircraft to depart the airport terminal further comprising:
  determining positions of the other aircraft transiting through each one of the plurality of cells;
  using the plurality of sensors controlled by the computer-programmable central processing device to influence the movement of the at least one aircraft through the at least one cell for departure; and
  decoupling the at least one aircraft from the computer-programmable, autonomous coupling device to allow the at least one aircraft to be towed from the enclosed internal environment of the at least one cell of the plurality of cells to the engine run up area.

7. A method of transiting at least one aircraft arriving in and departing out of an integrated, multi-level airport terminal system as recited in claim 1, further comprising utilizing a plurality of movable connectors disposed on an upper level and a lower level on each side of the at least one cell of the at least one row for facilitating passenger movement into and out of the at least one aircraft.

8. A method of transiting at least one aircraft arriving in and departing out of an integrated, multi-level airport terminal system as recited in claim 7, wherein the plurality of movable connectors are temporarily connected on a starboard side and a port side of at least one aircraft for facilitating simultaneous passenger movement between the internal environment of the at least one aircraft and each of the levels of the airport terminal from the starboard side and the port side of the at least one aircraft.

9. A method of transiting at least one aircraft arriving in and departing out of an integrated, multi-level airport terminal system as recited in claim 7, wherein the plurality of movable connectors are configured in a communicating relation with the computer-programmable central processing device for the movable connectors to switch between a stowed position and an operating position.

10. A method of transiting at least one aircraft arriving in and departing out of an integrated, multi-level airport terminal comprising:
  determining at least one transiting requirement of at least one aircraft arriving to an airport runway using a computer-programmable scheduling medium to prevent aircraft congestion;
  ascertaining the positions of all the other aircraft transiting through each one of a plurality of cells of each one of a plurality of rows;
  guiding the at least one aircraft from the airport runway on to a ramp member, wherein the ramp member is disposed through an entirely covered internal environment of at least one cell of the plurality of cells;
  utilizing a plurality of movable connectors disposed on an upper level and a lower level on each side of at least one cell for facilitating passenger movement simultaneously into and out of the at least one aircraft; and
  directing the at least one aircraft out of the enclosed internal environment of at least one cell of the plurality of cells of at least one row of the plurality of rows to an engine run up area for the at least one aircraft to depart the airport terminal.

11. A method according to claim 10, wherein utilizing a plurality of movable connectors disposed on an upper level and a lower level on each side of at least one cell for facilitating passenger movement simultaneously into and out of the at least one aircraft further comprising:
  storing the plurality of movable connectors within the enclosed internal environment of the at least one cell in a stowed position, wherein the stowed position defining the plurality of movable connectors not engaged in enplaning and deplaning of passengers; and
  operating the plurality of movable connectors within the enclosed internal environment of the at least one cell in an operational position, wherein the operational position defining the plurality of movable connectors engaged in a simultaneous enplaning and deplaning of passengers.

12. A method according to claim 11 further comprising the plurality of connectors within the enclosed internal environment of the at least one cell disposed on a starboard side and a port side of at least one aircraft.

13. A method of transiting at least one aircraft arriving in and departing out of an integrated, multi-level airport terminal comprising:
- determining at least one transiting requirement of at least one aircraft arriving to an airport runway using a computer-programmable scheduling medium to prevent aircraft congestion;
- determining the transiting positions of each aircraft within an enclosed internal environment of each one of a plurality of cells of each one of a plurality of rows for the at least one aircraft to transit using a computer-programmable airport surface detection equipment;
- authorizing the at least one aircraft to transit into the at least one cell of the plurality of cells of the at least one row of the plurality of rows pre-determined by the availability of the at least one cell of the at least one row and the transiting requirement of the at least one aircraft;
- communicating the availability and assignment of the at least one cell of the plurality of cells with the aircraft personnel to facilitate the at least one aircraft to transit to the at least one cell of the plurality of cells;
- utilizing a sequential and linear arrangement to facilitate the transit of the at least one aircraft entirely through the enclosed internal environment of the at least one cell of the plurality of cells;
- utilizing a plurality of sensors controlled by a computer-programmable central processing device to advance the movement of at least one aircraft entirely through the enclosed internal environment of the at least one cell of the at least one row;
- providing at least one service to the at least one aircraft in relation to the at least one transiting requirement of the at least one aircraft;
- pulling the at least one aircraft in the sequential and linear arrangement with the aid of a computer-programmable, autonomous coupling device simultaneously in relation to the other transiting aircraft;
- determining positions of the other aircraft transiting through each one of the plurality of cells;
- using the plurality of sensors controlled by the computer-programmable central processing device to influence the movement of the at least one aircraft through the at least one cell for departure; and
- decoupling the at least one aircraft from the computer-programmable, autonomous coupling device to allow the at least one aircraft to be towed from the enclosed internal environment of the at least one cell of the plurality of cells to the engine run up area.

* * * * *